(12) United States Patent
Priest et al.

(10) Patent No.: US 12,040,621 B2
(45) Date of Patent: Jul. 16, 2024

(54) SYSTEM FOR COLLECTING, GENERATING, AND TRANSMITTING GIGAWATT SCALE ENERGY FROM A PLURALITY OF DISTRIBUTED SOURCES DISPERSED OVER AN AREA

(71) Applicant: INTERCONTINENTAL ENERGY HOLDINGS GROUP LIMITED, Tortola (VG)

(72) Inventors: Warner Denis Priest, South Perth (AU); Richard Douglas Colwill, Hong Kong (CN); Alexander Keith Tancock, Muscat (OM)

(73) Assignee: INTERCONTINENTAL ENERGY HOLDINGS GROUP LIMITED, Tortola (VG)

( * ) Notice: Subject to any disclaimer, the term of this patent is extended or adjusted under 35 U.S.C. 154(b) by 0 days.

(21) Appl. No.: 17/759,705

(22) PCT Filed: Mar. 4, 2022

(86) PCT No.: PCT/IB2022/051953
§ 371 (c)(1),
(2) Date: Jul. 28, 2022

(87) PCT Pub. No.: WO2023/105300
PCT Pub. Date: Jun. 15, 2023

(65) Prior Publication Data
US 2024/0014662 A1    Jan. 11, 2024

Related U.S. Application Data

(60) Provisional application No. 63/287,841, filed on Dec. 9, 2021.

(51) Int. Cl.
*H02J 3/38* (2006.01)
*H02J 3/32* (2006.01)
*H02J 15/00* (2006.01)

(52) U.S. Cl.
CPC ................ *H02J 3/381* (2013.01); *H02J 3/32* (2013.01); *H02J 15/008* (2020.01);
(Continued)

(58) Field of Classification Search
CPC ...................................................... H02J 3/381
(Continued)

(56) References Cited

U.S. PATENT DOCUMENTS

| 5,592,028 A | 1/1997 | Pritchard |
| 6,100,600 A | 8/2000 | Pflanz |

(Continued)

FOREIGN PATENT DOCUMENTS

| AU | 2003210246 | 1/2006 |
| AU | 2014100635 | 7/2014 |

(Continued)

OTHER PUBLICATIONS

Amore-Domenech et al., "Bulk power transmission at sea: Life cycle cost comparison of electricity and hydrogen as energy vectors," Applied Energy, 288:116625, 29 pages, 2021.
(Continued)

*Primary Examiner* — Joseph Chang
(74) *Attorney, Agent, or Firm* — Norton Rose Fulbright US LLP

(57) ABSTRACT

A system for collecting, generating, and transmitting Gigawatt scale energy is provided. The system comprises a geographically dispersed network comprising a plurality of nodes, each node comprising: a water source; renewable energy sources comprising: a wind turbine string of a plurality of wind turbines; and a solar photovoltaic string; a
(Continued)

nodal substation in electrical communication with the renewable energy sources. The nodal substation comprises: at least one electrolyser in electrical communication with the renewable energy sources, the at least one electrolyser configured to convert water from the water source into hydrogen, or hydrogen compound, with electricity from the renewable energy sources; a compressor to compress hydrogen, or hydrogen compound, from the at least one electrolyser into a pipeline fluidly connecting each node. The nodal substation is positioned a distance from the renewable energy sources such that energy transfer efficiency to a load exceeds traditional high voltage power transmission.

20 Claims, 24 Drawing Sheets

(52) U.S. Cl.
CPC ....... *H02J 2300/24* (2020.01); *H02J 2300/28* (2020.01); *H02J 2300/40* (2020.01)

(58) Field of Classification Search
USPC .......................................................... 307/64
See application file for complete search history.

(56) References Cited

U.S. PATENT DOCUMENTS

| | | |
|---|---|---|
| 6,569,298 B2 | 5/2003 | Merida-Donis |
| 6,745,105 B1 | 6/2004 | Fairlie et al. |
| 6,833,631 B2 | 12/2004 | Van Breems |
| 7,326,329 B2 | 2/2008 | Gomez |
| 7,329,099 B2 | 2/2008 | Hartman |
| 7,444,189 B1 | 10/2008 | Marhoefer |
| 7,471,010 B1 | 12/2008 | Fingersh |
| 7,605,326 B2 | 10/2009 | Anerson |
| 7,989,507 B2 | 8/2011 | Rising |
| 8,019,445 B2 | 9/2011 | Marhoefer |
| 8,721,868 B2 | 5/2014 | Kelly et al. |
| 9,222,459 B2 | 12/2015 | Perez Barbachano et al. |
| 9,631,287 B2 | 4/2017 | Grauer et al. |
| 10,066,511 B2 | 9/2018 | Heid et al. |
| 10,138,563 B2 | 11/2018 | Kumano |
| 10,208,665 B2 | 2/2019 | Simpson |
| 10,283,797 B2 | 5/2019 | Fulde |
| 10,323,544 B2 | 6/2019 | Heid et al. |
| 10,396,388 B2 | 8/2019 | Bosmann et al. |
| 10,900,130 B2 | 1/2021 | Yang et al. |
| 2004/0204503 A1 | 10/2004 | Beyer |
| 2005/0165511 A1 | 7/2005 | Fairlie |
| 2006/0163880 A1 | 7/2006 | Wobben |
| 2006/0207178 A1 | 9/2006 | Hsu |
| 2006/0208571 A1 | 9/2006 | Fairlie |
| 2007/0163256 A1 | 7/2007 | McDonald et al. |
| 2009/0302613 A1 | 12/2009 | Ullman |
| 2009/0313896 A1 | 12/2009 | Glidewell |
| 2010/0116684 A1 | 5/2010 | Sawyer |
| 2010/0269498 A1 | 10/2010 | Wright |
| 2011/0155583 A1 | 6/2011 | Li |
| 2011/0207007 A1 | 8/2011 | Ab Wahid et al. |
| 2013/0042626 A1* | 2/2013 | Johnston .......... H02J 3/381 60/39.12 |
| 2013/0153438 A1 | 6/2013 | Ab Wahid et al. |
| 2015/0144500 A1 | 5/2015 | James |
| 2015/0377211 A1 | 12/2015 | Occhiello |
| 2016/0006066 A1 | 1/2016 | Robertson |
| 2016/0362799 A1 | 12/2016 | Ramos Agundo |
| 2018/0258847 A1 | 9/2018 | Dietrich |
| 2019/0249319 A1 | 8/2019 | Joos et al. |
| 2020/0277894 A1 | 9/2020 | Heid et al. |
| 2021/0301410 A1 | 9/2021 | Groendahl et al. |

FOREIGN PATENT DOCUMENTS

| | | |
|---|---|---|
| CN | 103441564 | 3/2017 |
| CN | 109995081 | 7/2019 |
| DE | 102008048192 | 4/2010 |
| EP | 1606216 | 12/2005 |
| EP | 1478851 | 7/2006 |
| EP | 2565296 | 4/2014 |
| EP | 1719235 | 9/2017 |
| EP | 3155237 | 2/2018 |
| EP | 3071734 | 8/2018 |
| EP | 3154904 | 9/2018 |
| EP | 3648298 | 5/2020 |
| EP | 3766160 | 1/2021 |
| EP | 3877648 | 9/2021 |
| WO | WO 2006/097494 | 9/2006 |
| WO | WO 2020/163894 | 8/2020 |

OTHER PUBLICATIONS

Borm and Harrison, "Reliable off-grid power supply utilizing green hydrogen," Clean Energy, 5(3):441-446, 2021.

Cordis, "Improved electrolysis for Off-grid Hydrogen production," H2020 Programme, European Commission, Jul. 21, 2016 [retrieved Nov. 15, 2021]. Retrieved from the Internet: <URL:https://cordis.europa.eu/programme/id/H2020_FCH-02.1-2015>, 3 pages.

Gracia et al., "Use of Hydrogen in Off-Grid Locations, a Techno-Economic Assessment," Energies, 11:33141, 16 pages, 2018.

Gutierrez-Martin, "Hydrogen production by water electrolysis and off-grid solar PV," International Journal of Hydrogen Energy, 46(57):29038-29048, 2020. (Abstract only).

Irena, "Renewable Power-to-Hydrogen, Innovation Landscape Brief," International Renewable Energy Agency, Abu Dhabi, 28 pages, 2019.

Leighty et al., "Large Renewables—Hydrogen Energy Systems: Gathering and Transmission Pipelines for Windpower and other Diffuse, Dispersed Sources," World Gas Conference, Tokyo, Japan, Jun. 1-5, 2003.

Leighty, "Running the world on renewables: Hydrogen transmission pipelines and firming geologic storage," International Journal of Energy Research, 32:408-426, 2008.

Nrel, "Wind-to-Hydrogen Project," National Renewal Energy Laboratory, U.S. Department of Energy, [retrieved Nov. 14, 2021]. Retrieved from the Internet: URLhttps://www.nrel.gov/hydrogen/wind-to-hydrogen.html, 2 pages.

Office of Energy Efficiency & Renewal Energy, "How Wind Energy Can Help Clean Hydrogen Contribute to a Zero-Carbon Future," Aug. 20, 2021 [retrieved Nov. 15, 2021]. Retrieved from the Internet: URL:<https://www.energy.gov/eere/articles/how-wind-energy-can-help-clean-hydrogen-contribute-zero-carbon-future>, 6 pages.

Parnell, "Why Offshore Wind and Energy Giants Are Chasing Off-Grid Green Hydrogen," Greentech Media, Dec. 1, 2020 [retrieved Nov. 15, 2021]. Retrieved from the Internet: URL:<https://www.greentechmedia.com/articles/read/why-offshore-wind-and-energy-giants-are-chasing-off-grid-green-hydrogen>, 4 pages.

PCT International Search Report and Written Opinion issued in International Application No. PCT/IB2022/051953, dated May 12, 2022.

Shah et al., "Using Wind Energy for Hydrogen Production: An Innovative Concept," AltEnergyMag, May 4, 2021 [retrieved Nov. 15, 2021]. Retrieved from the Internet: <URL:https://www.altenergymag.com/article/2021/04/using-wind-energy-for-hydrogen-production-an-innovative-concept/35012>, 12 pages.

* cited by examiner

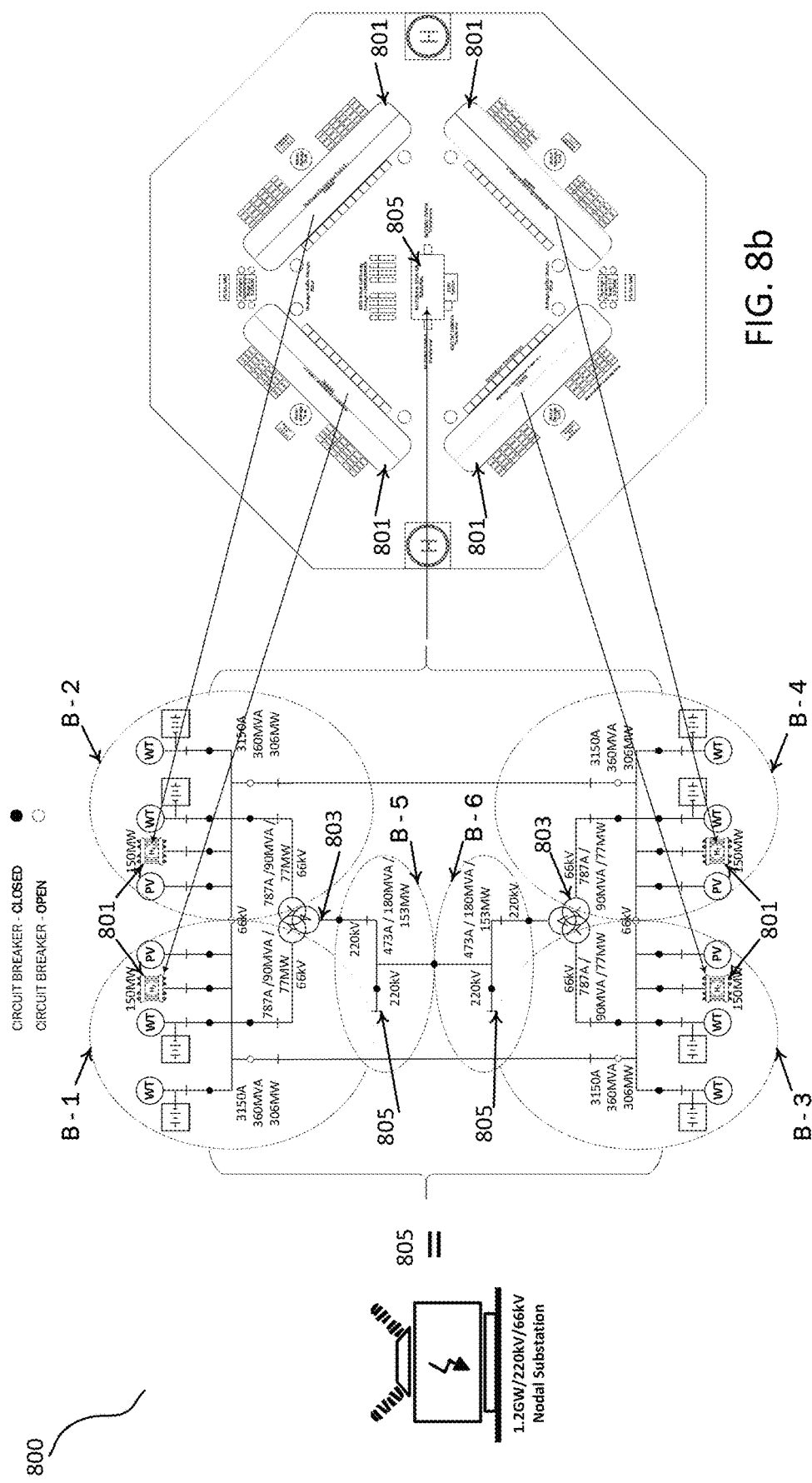

SYSTEM FOR COLLECTING, GENERATING, AND TRANSMITTING GIGAWATT SCALE ENERGY FROM A PLURALITY OF DISTRIBUTED SOURCES DISPERSED OVER AN AREA

CROSS REFERENCE TO RELATED APPLICATION AND CLAIM OF PRIORITY

The present application is a national phase application under 35 U.S.C. § 371 of International Application No. PCT/IB2022/051953, filed on Mar. 4, 2022, which claims priority to U.S. provisional patent application No. 63/287,841 filed on Dec. 9, 2021, the entire contents of which are hereby incorporated by reference.

TECHNICAL FIELD

The disclosure relates generally to power generation and transmission, and more particularly to scalable geographically distributed power generation and transmission systems.

BACKGROUND

Prior to electricity transmission, various systems were used for the transmission of power across large distances, e.g., 20 km to 50 km; chief amongst them were pneumatic (pressurized air), and hydraulic (pressurized fluid) transmission.

Pneumatic transmission was used for city power transmission systems in Paris and several other European cities at the beginning of the 20th century. Cities in the 19th century also used hydraulic transmission using high pressure water mains to deliver power to factory motors, for example London's system delivered 5.2 MW over a 290 km network of pipes carrying water at 55 bar. These systems were eventually replaced by the cheaper and more versatile electrical systems, and by the end of the 19th century city planners and financiers realised the additional benefits, economics, and process of establishing power transmission systems that could connect between cities greater than 300 km apart.

Early electric power usage and widespread transmission of electric power had two obstacles. Firstly, devices requiring different voltages required specialized generators with their own separate power lines. Streetlights, electric motors in factories, power for streetcars and lights in homes are some of the examples of the diversity of devices that required separate voltages. Secondly, generators had to be relatively near to their loads (a kilometre at most for low voltage device connections) due to the high electrical losses at low voltages. It was known that longer distance transmission was possible the higher the voltage was raised, so both problems could be efficiently solved if the voltages could be transformed to a single universal power line voltage.

High voltage power transmission was of interest to early researchers working on the problem of high-power transmission over long distances. From elementary electricity principle the same amount of power could be transferred on a cable or conductor by doubling the voltage, and as a result halving the current. Due to Joule's Law, it was also known that the power lost from heat because of resistance in a conductor is proportional to the square of the current traveling through it regardless of the voltage, so, by doubling the voltage the same cable would be capable of transmitting the same amount of power four times the distance.

The idea of investing in a central power electricity generation plant and a network to deliver energy generated centrally to distributed electricity consumers who pay a recurring fee for the service was a familiar business model for investors. It was identical to the lucrative gaslight business, or the hydraulic and pneumatic power transmission systems of past times. The only difference was the commodity being delivered was not gas (molecules), through "pipelines" but electricity (electrons), through "conductors/cables/overhead lines" that at the time then became the more flexible solution for delivering energy. The method for delivering bulk energy to end users then transitioned over time from just gas (molecules) supplied through a network of distributed pipelines to a combination of both gas (molecules) supplied through a network of distributed pipelines and electricity (electrons) supplied through a network of transmission and distribution cables and overhead lines; but the energy source was still the initial energy store in gas, coal, and/or oil (molecules) we mine out of the geosphere.

Modern centralized electricity generation plants may be fueled by large amounts of energy stores we source from the geosphere that has been created over millions of years. Fossil fuel (stored energy) is mined and burned converting it from the chemical energy state it is in, to thermal energy as superheated steam then mechanical energy which in turn drives an alternator (generator) converting the mechanical energy into electrical energy.

With the advancements in renewable energy generation and the considerable cost reductions in generating electricity from wind turbines and solar photovoltaic modules reliance on fossil fuel hydrocarbons can be reduced. However, reliance on electrons alone may not be possible to meet global energy demand because electricity (electrons), i.e., electrons flow, cannot be stored; rather, the electrons need to be used instantaneously or converted into some other form of stored energy. Further, the electricity that wind and solar generates is variable and the load that it feeds tends to also be variable (and often the energy generated does not correlate with energy demanded by its consumers), for this reason we require large amounts of stored energy to serve our energy consumer needs 24/7 all year around. For smaller amounts of energy storage, electric energy may be converted into a chemical energy stored in batteries; however, this may be impractical for large scale (Gigawatt) levels of power transfer and storage requirements.

Electricity generated from renewable energy sources, e.g., wind turbines and/or photovoltaic cells/skids, may need to be converted to high voltage/extremely high voltage electricity for long distance transmission. However, there may be considerable energy loss in transformers when converting from DC to AC or from direct current or low voltage, to high voltage/extremely high voltage and back down to a usable voltage suitable for a load.

Electricity from renewable energy generation may also be converted into hydrogen for transport, e.g., an electrolyser at an off-shore wind turbine has been used to convert electricity generated by the wind turbine into hydrogen yet this arrangement may not be efficient for large scale (Gigawatt scale) of power transfer.

SUMMARY

This disclosure provides a geographically distributed nodal network of renewable energy generation to capture renewable energy and convert it into a hydrogen energy store. Distributed energy sources of wind, solar and water may be converted to hydrogen at a scale typical of traditional oil and gas mass energy power sources (Gigawatt energy scale) in centralized processing plants. However, an issue with generating vast amounts of renewable energy at a similar scale to traditional oil and gas mass energy power generation and transmitting/distributing this power as electricity over the vast network of electrical assets (e.g. overhead lines, cables, transformers, and switchgear), is the electricity needs to be transformed to extremely high voltages so that it can be transmitted to centralized plants where the electrical energy can be converted to hydrogen or hydrogen compound.

In an aspect, the disclosure describes a system for collecting, generating, and transmitting Gigawatt scale energy from a plurality of distributed sources dispersed over an area. The system comprises: an geographically dispersed network comprising a plurality of nodes, each node comprising: a water source; renewable energy sources comprising: a wind turbine string of a plurality of wind turbines; and a solar photovoltaic string of a plurality of solar photovoltaic skids; a nodal substation in electrical communication with the renewable energy sources. The nodal substation comprises: at least one electrolyser in electrical communication with the renewable energy sources, the at least one electrolyser configured to convert water from the water source into Hydrogen ($H_2$), or a hydrogen compound, with electricity from the renewable energy sources; a compressor to compress $H_2$, or Hydrogen compound, from the at least one electrolyser into a pipeline fluidly connecting each node. The nodal substation is positioned a distance from the renewable energy sources, the distance selected such that:

$$\text{Energy Efficiency}_{H2\ transmission} > \text{Energy Efficiency}_{High\ voltage\ power\ transmission}$$

where Energy Efficiency$_{H2\ transmission}$ is the energy efficiency of transmitting energy from the renewable energy sources to the load via the nodal substation as $H_2$ or hydrogen compound, and where Energy Efficiency$_{High\ voltage\ power\ transmission}$ is the energy efficiency of transmitting energy from the renewable energy sources to the load via High Voltage Power Transmission. A load is in fluid communication with the pipeline for receiving $H_2$, or hydrogen compound, from the plurality of nodes.

In an embodiment, the renewable energy sources of each node define a perimeter and the nodal substation is defined with the perimeter.

In an embodiment, the renewable energy sources of each node comprise a plurality of wind turbine strings and a plurality of photovoltaic strings in electrical communication.

In an embodiment, the area is at least 500 km$^2$.

In an embodiment, each node collects renewable sources at a distributed voltage level from the wind turbine and photovoltaic strings, the node positioned within 50 km of the wind turbine and photovoltaic strings.

In an embodiment, the renewable energy sources are in electrical communication with the load, and wherein the node comprises at least one step-up power transformer in electrical communication with the renewable energy sources and the load, the at least one transformer configured to increase the voltage of electricity transmitted to the load from the renewable energy sources.

In an embodiment, the node is positioned at least 50 km from the load.

In an embodiment, the system is Islanded.

In an embodiment, each string is rated to carry a maximum current carrying capacity at a rated Medium Voltage (MV), High Voltage (HV), Alternating Current (AC) of a switchgear within the string, preferably each string has a current carrying capacity of at least 1,250 A at 66 kV.

In an embodiment, a ratio of each renewable energy source is configured to provide a lowest levelized cost of energy (LCOE), wherein the LCOE is:

{(overnight capital cost*capital recovery factor+fixed O&M cost)/(8760*capacity factor)}+(fuel cost*heat rate)+variable O&M cost.

In an embodiment, each node is configured to generate maximum energy based on a current carrying capacity limit of a switchgear and transformer of each node, preferably the generated energy can be collected at medium voltage and/or high voltage, more preferably generated energy is between 1.2 GW and 1.3 GW.

In an embodiment, the renewable energy source are positioned to maximize energy generation for a geographical area of each node.

In an embodiment, the solar photovoltaic string is a solar farm comprising a maximum number of solar photovoltaic skids limited by a current carrying capacity of a switchgear of the solar photovoltaic string at medium voltage and/or high voltage.

In an embodiment, each solar photovoltaic string is defined within a perimeter of the wind turbine strings.

In an embodiment, the wind turbine string is comprises a maximum number of wind turbines limited by a current carrying capacity of a switchgear of the wind turbine string at medium voltage and/or high voltage.

In an embodiment, each wind turbine is positioned to minimize blade tip vortices interferences between adjacent wind turbines, preferably each wind turbine is positioned at least 800 m apart.

In an embodiment, each wind turbine is positioned from adjacent wind turbines to minimize wake interference.

In an embodiment, the pipeline is a high pressure hydrogen pipeline.

In an embodiment, the load is configured to use the hydrogen, preferably the load is at least one of an Ammonia, Methanol, or Methane processing plant.

In an embodiment, the system comprises a controller configured to selectively electrically communicate each electrolyser with the renewable energy sources within a current carry capacity threshold of a switch gear at medium or high voltage. The at least one electrolyser may comprise a first electrolyser and a second electrolyser electrically coupled together at the switchgear having threshold value representing a rating of the switchgear, and wherein the controller is configured to electrically disconnect the first electrolyser from the second electrolyser when the threshold value is exceeded.

In an embodiment, the system comprises a controller configured to increase pressure in the pipeline when energy generated by the renewable energy sources is greater than energy consumed by the load.

In an embodiment, the controller is configured to cause the compressor to compress $H_2$, or hydrogen compound, into the pipeline at a rate lower than a rate of $H_2$, or hydrogen compound, consumed by the load.

In an embodiment, the controller is configured to reduce $H_2$, or hydrogen compound, demand by the load when pressure in the pipeline reaches a minimum threshold. The minimum threshold may be about less than 50 bar.

In an embodiment, the controller is configured to cause the compressor to compress $H_2$, or hydrogen compound, into the pipeline at a rate lower than a rate of $H_2$, or hydrogen compound, consumed by the load.

In an embodiment, the controller is configured to convert greater than 50% of the energy generated by the renewable energy sources into $H_2$, or hydrogen compound, by the at least one electrolyzer for transmission to the load.

In an embodiment, the system comprises a concentrated solar power plant (CSP) string including a plurality of concentrated solar power plant generators.

In an embodiment, the system comprises a wave and/or tidal power generator string including a plurality of wave and/or tidal power generators.

In an embodiment, the system comprises a geothermal power string including a plurality of geothermal power generators.

In an embodiment, the string size is limited by a switchgear current carrying capacity at medium or high voltage.

In an embodiment, each node is in electrical communication with Extremely High Voltage (EHV) or High Voltage transmission lines, power cables, power transformers and switchgear rated to their maximum current carrying capacity to transmit electricity to the load.

In an embodiment, the gigawatt scale energy is at least 6 GW.

Embodiments may include combinations of the above features.

In another aspect, the disclosure describes a system for collecting, generating, and transmitting Gigawatt scale energy from a plurality of distributed sources dispersed over an area. The system comprises: an geographically dispersed network comprising a plurality of nodes, each node comprising: a water source; renewable energy sources; and a nodal substation in electrical communication with the renewable energy sources. The nodal substation comprising: at least one electrolyser in electrical communication with the renewable energy sources, the at least one electrolyser configured to convert water from the water source into Hydrogen ($H_2$), or hydrogen compound, with electricity from the renewable energy sources; a compressor to compress $H_2$, or Hydrogen compound, from the at least one electrolyser into a pipeline fluidly connecting each node. The nodal substation is positioned a distance from the renewable energy sources, the distance selected such that:

$$\text{Energy Efficiency}_{H2\ transmission} > \text{Energy Efficiency}_{High\ voltage\ power\ transmission}$$

where Energy Efficiency$_{H2\ transmission}$ is the energy efficiency of transmitting energy from the renewable energy sources to the load via the nodal substation as $H_2$, or hydrogen compound, and where Energy Efficiency$_{High\ voltage\ power\ transmission}$ is the energy efficiency of transmitting energy from the renewable energy sources to the load via High Voltage Power Transmission. A load is in fluid communication with the pipeline for receiving $H_2$, or hydrogen compound, from the plurality of nodes.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 8A shows a schematic view of electrical connections of an example node including example connections of wind turbine strings, solar photovoltaic strings, electrolysers, and a load where bus-section breaker(s) and bus-coupler breaker(s) are open. FIG. 8B shows an overhead plan view of a centre of the example node distributed over a geographic area;

FIG. 11a shows a schematic diagram of an example node of FIG. 3 or FIG. 5. FIG. 11b shows an overhead plan view of an example geographical distribution of wind turbine strings and solar photovoltaic strings of the example node of FIG. 11a;

DETAILED DESCRIPTION

Figure 1:
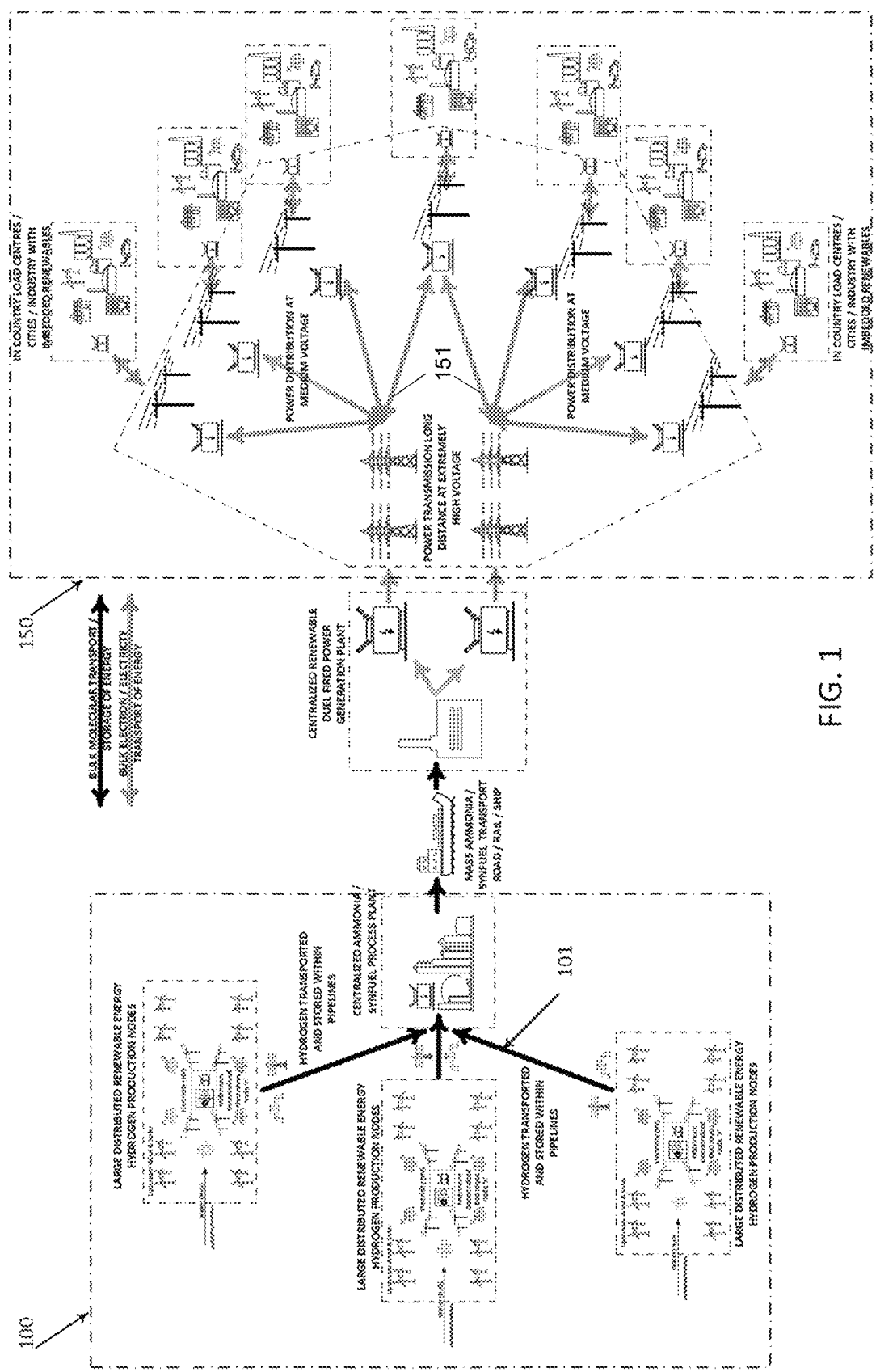
FIG. 1 shows a schematic diagrams of two example systems for collecting, generating, and transmitting Gigawatt scale energy from a plurality of renewable distributed sources.

This disclosure provides a system for generating and transmitting Gigawatt scale energy from a plurality of distributed sources. The system comprises a geographically distributed network of nodes acting as a net to capture energy from wind and solar sources and convert that energy into hydrogen this used for energy storage and efficient energy transmission to a user when compared to traditional means of transferring energy as electricity using high-voltage or extremely-high-voltage lines.

The system may provide scalable renewably generated energy across large geographically dispersed areas, where the variable renewable energy generated is transformed within nodes and then, transmitted and distributed to serve a particular end use demand as electricity (electrons) and/or molecules (hydrogen or hydrogen compounds).

In an aspect, this disclosure provides a system for generating and transmitting Gigawatt scale energy from a plurality of distributed sources. The system comprises: a geographically dispersed network comprising a plurality of nodes, each node may comprise: a water source; renewable energy sources comprising: a wind turbine string of a plurality of wind turbines; and a solar photovoltaic string of a plurality of solar photovoltaic skids; a nodal substation in electrical communication with the renewable energy sources. The nodal substation may comprise: at least one electrolyser in electrical communication with the renewable energy sources, the at least one electrolyser configured to convert water from the water source into Hydrogen ($H_2$) or a hydrogen compound with electricity from the renewable energy sources; a compressor to compress $H_2$ from the at least one electrolyser into a pipeline fluidly connecting each node. The nodal substation is positioned a distance from the renewable energy sources, the distance selected such that:

$$\text{Energy Efficiency}_{H2\ transmission} > \text{Energy Efficiency}_{High\ voltage\ power\ transmission}$$

where Energy Efficiency$_{H2\ transmission}$ is the energy efficiency of transmitting energy from the renewable energy sources to the load via the nodal substation as $H_2$, and where Energy Efficiency$_{High\ voltage}$ power transmission is the energy efficiency of transmitting energy from the renewable energy sources to the load via High Voltage Power Transmission; and a load in fluid communication with the pipeline for receiving H2 from the plurality of nodes.

Although terms such as "maximize", "minimize" and "optimize" may be used in the present disclosure, it should be understood that such term may be used to refer to improvements, tuning and refinements which may not be strictly limited to maximal, minimal or optimal.

The term "connected" or "coupled to" may include both direct coupling (in which two elements that are coupled to each other contact each other) and indirect coupling (in which at least one additional element is located between the two elements).

The term "substantially" as used herein may be applied to modify any quantitative representation which could permissibly vary without resulting in a change in the basic function to which it is related. For example, a drive shaft as disclosed herein having a circular transverse cross-section may permissibly have a somewhat non-circular cross-section within the scope of the invention if its rotational driving capability is not materially altered.

The term "String" as used herein may refer to a group of interconnected medium or high voltage renewable energy generation sources and an associated nodal substation.

The term "Gigawatt scale energy" as used herein may be used to refer Gigawatt scale with peak generation capacities of 2.5 GW to over 250 GW.

"Islanded" is used herein to refer to a system that is not connected to an electrical grid with its own energy generation source or has the ability to disconnect and operate normally independent of another grid or part of a grid that has its own energy generation source.

The term "Load" is used herein to refer to a processing plant or power station which converts $H_2$, or hydrogen compound, into a larger compound or into electricity. Example loads include: Green Steel, Ammonia, Methanol, Methane processing plants or gas turbines/gas engines/fuel cells.

The term "Electrical Load" is used herein to refer to a processing plant or load which uses electricity. Example loads include: Green Steel processing Plant, Ammonia processing Plant, Methanol processing Plant, Methane processing plant, desalination processing plant, Electrolyser plant, Towns and/or Cities.

The term "Hydrogen Compound" is used herein to refer to a hydrogen atom and one or more other atoms, e.g., Water ($H_2O$) is a hydrogen compound, Ammonia ($NH_3$) is a hydrogen compound, there are over 30 hydrogen compounds.

The term "Electrolyser" is used herein to refer to electrolyser(s) that produce hydrogen or hydrogen compound. Example electrolysers includes Alkaline Electrolyzers, Proton Exchange Membrane (PEM) Electrolyzers, Solid Oxide Electrolyzers (SOEC), Anion exchange membrane (AEM) electrolysis and any other form of water electrolysis.

The term "Geographically dispersed network" is used herein to refer to a plurality of Nodes spread over a geographic area, e.g., 600 km² to over 50,000 km².

"Node" or "Nodes" is used herein to refer to a geographically distributed array of renewable energy sources that electrically communicate with electrolyser(s) to produce hydrogen and oxygen from water, or a Hydrogen Compound from electrolysis reagents, and electricity which is transferred to the Load via compressor(s) and pipeline(s) at high pressure. Optionally, a Node may transfer electricity to the Load via switchgear, power transformers, overhead lines, and/or power cables at higher voltages that electrically communicate with other Nodes. Each Node is fluidly connected with the pipeline to form the "geographically dispersed network".

"Nodal Substation" is used herein to refer to a medium or high voltage substation comprising medium and/or high voltage switchgears in electrical communication with strings, electrolysers, transformers, power cables, overhead lines and other ancillary loads that demand electricity.

"Renewable Energy Sources" or "Renewable Energy Generation Sources" means a energy source produced using natural resources that are constantly replaced by natural reproduction or other recurring processes in a finite amount of time in a human time scale, i.e., Solar Photovoltaic Power, Wind Power, Concentrated Power, Wave Power, Tidal Power and Geothermal Power.

The term "Switchgear" is used herein to refer to Primary circuits composed of electrical disconnect switches, fuses or circuit breakers used to control, protect, and isolate electrical equipment at Low Voltages, Medium Voltages, High Voltages and Extremely High Voltages.

The term "Medium Voltage" (MV) is used herein to refer to AC (Alternating Current) electrical communication voltage at which electricity is transmitted and/or distributed at between 1 kV and 36 kV.

The term "High Voltage" (HV) is used herein to refer to AC (Alternating Current) electrical communication voltage at which electricity is transmitted and/or distributed at between 36 kV and 230 kV.

The term "Extremely High Voltage" (EHV) is used herein to refer to AC (Alternating Current) electrical communication voltage at which electricity is transmitted and/or distributed at greater than 245 kV, for example between 245 kV and 1,200 kV.

Aspects of various embodiments are described through reference to the drawings.

Figure 2:
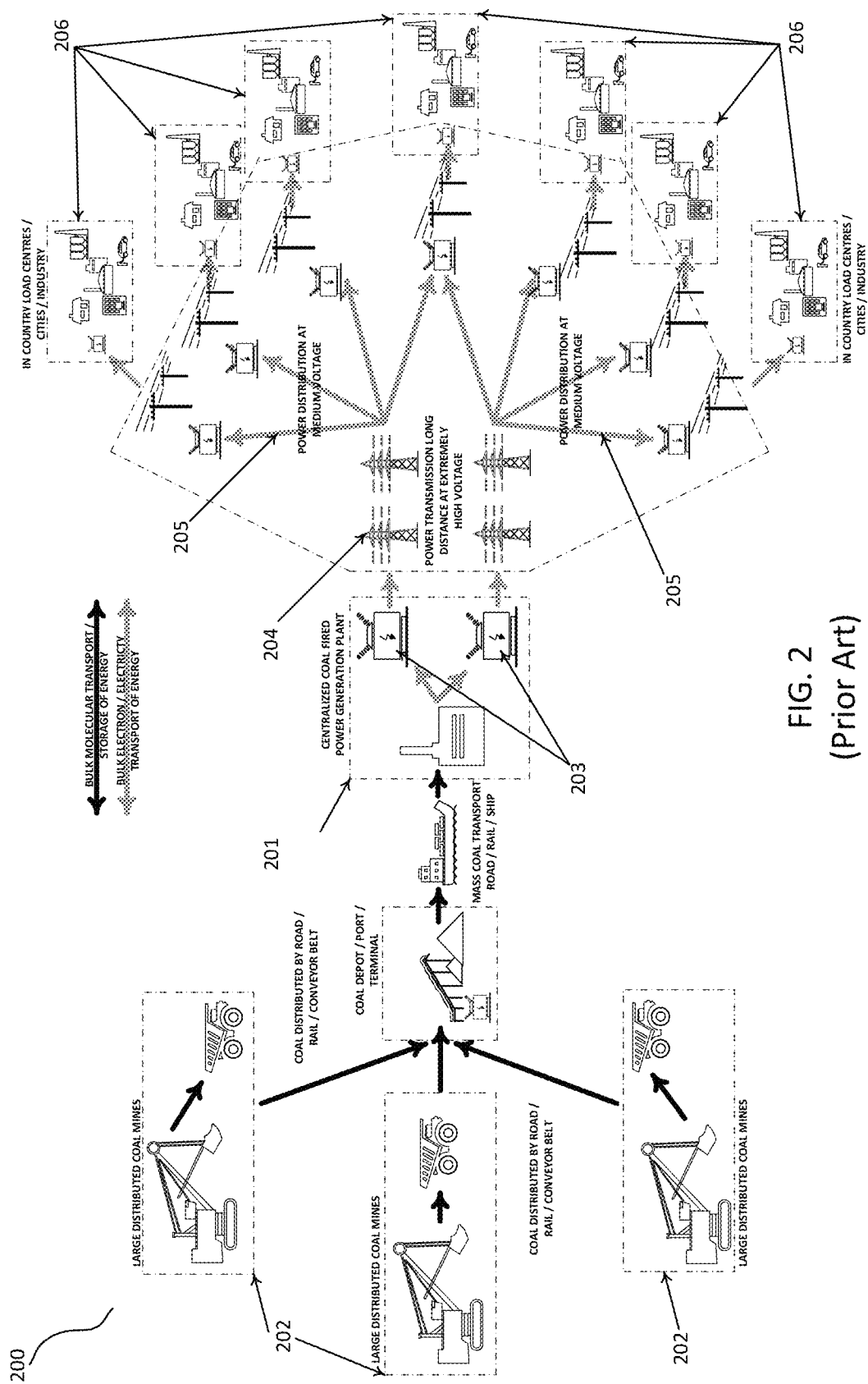
FIG. 2 is shows a schematic diagram of an example system for collecting, generating, and transmitting Gigawatt scale energy from coal sources.

FIG. 1 illustrates an example system 100 for generating and transmitting Gigawatt scale energy from a plurality of distributed sources. System 100 may provide variable renewable energy generation, storage & supply system to large energy consumers. System 100 may differ from prior art energy generating and transmission systems 200 illustrated in the example illustrated in FIG. 2 which have centralized power generation systems 201 (illustrated as coal fired power generation plants), fed by hydrocarbon fuel sources 202 (illustrated as coal mines and coal depots/ports/terminal), providing power to adjacent transmission substation 203, extremely high voltage power transformers 204, and overhead lines 205, feeding multiple distributed electrical loads 206, essentially:

Distributed fuels (coal, oil, gas, or wood)→concentrated generation of electricity→users An electrical transmission/distribution challenge of prior art energy generating and transmission systems, such as those illustrated in FIG. 2, is that when electricity is transmitted over long distances, there are inherent energy losses along the way. High voltage transmission minimizes the amount of power lost as electricity flows from one location to the next. The higher the voltage, the lower the current and therefore the lower the resistance losses in the conductors. An economic benefit may also be provided associated with high voltage transmission as at the lower currents require less copper and/or aluminium conductors in which the high voltage electricity flows. This means that thin, light-weight conductors can be used in long-distance transmission and the transmission towers do not need to be engineered to support the heavier conductors associated with lower voltage higher current energy transmission. These considerations, in some instances, make high voltage electricity transmission over long distances the most economical solution for high power energy transfer where the final energy consumed is as electricity and the cost of power transformers, switchgear and overhead lines required to transfer the electricity is justified economically by the proportionate distance the electricity is transmitted and distributed. However, high-power energy transfer of electricity generated from many distributed sources over short distances requiring the same very expensive power transformers, switchgear, and overhead lines where hydrogen is the final energy use, the proportion of electrical energy transmission and transformation costs required for the short distance transmitted proportionately is very expensive.

Prior centralized energy generation plants, such as coal and nuclear power generation plants, on average may have a generation capacity of ~6 GW to ~8 GW and transmit this power to load centres over many 100's to 1000's of kilometres, to distributed electrical networks connected to distributed load centres in country and/or between countries. The energy journey from energy store to energy use that relied on for these centralized energy generation plants may begin with the mining of stored energy below the geosphere (with the above example being coal), where the bulk of this resource is transported in its raw molecular form to the centralized coal fired power plant and there transformed into electrical energy and transmitted at extremely high voltages through transmission lines to our distributed electricity networks that are finally connected to our load centres/cities. This centralized generation and transmission of base load generation from coal, gas, hydro and nuclear has grown iteratively from very small networks to the super GW energy networks we have today.

More recently, variable renewable energy sources, such as wind turbines and solar photovoltaic cells, have been implemented to provide alternatives to reliance on non-renewable energy sources. These renewable energy sources may be integrated into existing electrical transmission networks and infrastructure; however, this may result in electrical lines losses and waste of energy. The shift to variable renewable energy provides an opportunity to change how energy is generated, stored, and delivered to load centres/cities. Unfortunately, while the energy potential in wind and solar is immense, it is a weather dependent variable resource that needs to be firmed with stored energy to meet the energy demand our load centres and cities have 24/7 all year around. Vast amounts of hydrogen is available as a resource in water (e.g. sea water) and is a key alternative to fossil fuels; however, we require abundant cheap energy to split the hydrogen molecule from the oxygen molecule. Wind and solar photovoltaic power energy generation may currently be the most efficient and installation costs of wind and solar photovoltaic power are expected to reduce further over the decades to come. Accordingly, in some aspects of this disclosure, energy from variable renewable energy sources may be generated and stored at scale for later use by a load.

Certain regions around the world may have excellent complimentary wind and solar resources across large expanses of remote desert areas adjacent to the sea. These areas cover between 600 km² to over 50,000 km² in areas with peak generation capacities of 1.2 GW to over 150 GW, where through many distributed energy 'Nodes' across a site, variable renewable energy can be collected and used to electrolyse water (e.g., desalinated sea water) to separate hydrogen from oxygen at a scale. When generating vast amounts of electricity from variable renewable sources on remote and expansive sites, a challenge presented is that there may be inefficient transportation and storage of this energy to load centres/cities that demand constant firmed energy to meet the demand all year around.

Electrical Connection & Hydrogen Production at Nodes

This disclosure details embodiments of how distributed wind and solar power used to produce hydrogen, and/or hydrogen compounds, may be collected and transmitted efficiently and economically via bulk molecular transfer 101 at an oil and gas Gigawatt scale using distributed renewable energy 'Nodes'. Each system described herein comprising a node may be islanded. What follows are some specific example embodiments, but the broad concept can be customized to any site, thereby providing a template for low-cost green hydrogen production.

Figure 3:
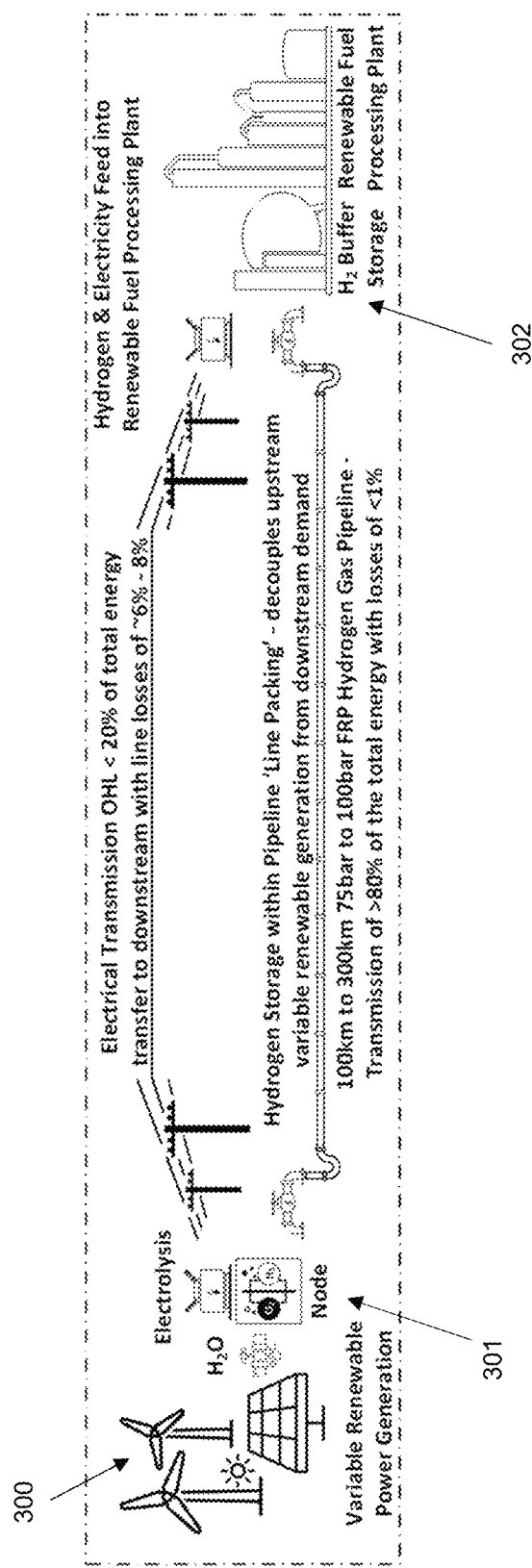
FIG. 3 shows a schematic overview of an example system for decentralized hydrogen production including a node in electrical and fluid communication with a renewable fuel processing plant. The node comprises wind turbine strings, solar photovoltaic strings, and nodal substation.

FIG. 3, illustrates an simplified schematic view of an example geographically distributed network of renewable energy generation sources comprising of wind and solar generation sources within upstream plant 300 that captures variable solar and wind energy which is then converted to high voltage electrical energy at very large scale. Upstream plant comprises a plurality of nodes 301 which are distributed geographically as described below with respect to FIG. 11B. Electrical energy from the renewable energy generation sources is then fed from the wind and solar assets to nodal substation(s) in the Midstream where a portion (e.g. less than 20% or more preferably less than 10%) of the variable high voltage electrical energy then transformed to Extremely High Voltages (EHV) for electrical transmission and distribution to a load 302, e.g. a centralized downstream facility which uses hydrogen molecules and/or hydrogen compounds such as an ammonia plant. Electrical Transmission may be via overhead transmission lines (OHL) which may be lines losses of approximately 6-8%. Each Node 301 is associated with a string of renewable energy generation sources. The bulk of the variable high voltage electrical energy generated (e.g. greater than 20% or more preferably greater than 80%) may be transformed into hydrogen molecules or a hydrogen compounds using water and electrolysers for a more efficient transmission and distribution of the bulk energy as hydrogen gas or a compound of hydrogen via a network of high pressure pipelines to the load 302 where the predominant input to the load 302 is hydrogen, i.e., for Ammonia, Methanol or Methane production. In the example, 22 GW energy transfer via overhead lines and $H_2$ Gas Pipeline is provided to the centralized downstream renewable fuel processing plant. In this example, energy transferred via the pipeline acts as gas catering for energy storage and energy firming by line packing of the hydrogen/hydrogen compound in the high pressure pipeline as the transmission of the gas in pipelines may be more cost effective and energy efficient than energy transmission in the form of electricity via high voltage lines. Line Packing may decouple upstream variable renewable generation from downstream demand. In an example, the pipelines may be 100-300 km in length and storing/transporting hydrogen at 75-100 bar with total energy losses of less than 1%. Load 302 may include $H_2$ buffer storage to supplement the pipelines.

A decentralized nodal concept where most of the electrical energy generated is transformed into hydrogen gas at high pressure and is then transmitted in pipelines to the downstream renewable fuel processing facility, also referred to herein as a load, is an energy efficient and cost effective method of transmitting bulk variable renewable energy from a multitude of geographically dispersed renewable energy nodes where the predominant demand of the downstream facility is hydrogen or a hydrogen compound.

Each node may be interconnected, e.g., via composite pipelines at 100 bar or greater, to allow for the storage of significant volumes of hydrogen. The pipelines effectively decouple 90% of the variable renewable energy generated required by the downstream renewable fuel processing facility due to the pipelines inherent hydrogen storage capacity, referred to as 'line packing', whilst at the same time facilitating a more efficient transmission of energy as hydrogen molecules in Fibre Reinforced Polymer (FRP) pipelines over hundreds of kilometres that would otherwise not be cost effective for the same energy transfer if it were as unfirmed electrical energy alone. As the generation and production of renewable energy at the nodes across a geographical area vary, the downstream renewable fuel processing plant draws down the hydrogen stored in the pipeline to a minimum allowable pressure, wherein the downstream renewable fuel processing plant, e.g. an ammonia plant, may continue to operate at a reduced capacity for a time duration, e.g. up to eight hours or more, when the renewable energy generation at the nodes is reduced.

Continuing the example of FIG. 3, bulk variable renewable energy may be transferred as electrons via overhead transmission lines and hydrogen (or hydrogen compound(s)) via FRP gas pipelines to load 302 from nodal substations and electrolyser(s) respectively in the midstream of each decentralized geographically dispersed node 301. Each nodal substation and/or electrolyser may be defined geographically within or adjacent to the wind/solar variable renewable energy generation sources. Bulk transfer of energy greater than 2.5 GW is most efficiently transferred as pressurized gas in gas pipelines where most of the energy required by the load 302 is hydrogen molecules and/or hydrogen compound(s). The transmission of this chemical energy as hydrogen gas, and/or hydrogen compound(s), would be substantially more efficient with losses of about less than 1%.

In an example, a distance between the strings of wind turbines and solar photovoltaic skids from a nodal substation and/or electrolyser train of node 301 may be 3-50 km. Electricity may be efficiently transmitted over these distances at 66 kV with losses of approximately between 1.5% and 2.5%; however, instead of transforming this energy at node 301 using step-up power transformers from High Voltage (HV) 66 kV to the Extremely High Voltages (EHV) of 500 kV, 765 kV or more within node 301, the electrical energy may be transformed into hydrogen or hydrogen compounds using electrolyser(s) of each node 301.

Hydrogen may be produced from electricity by electrolysis where the hydrogen molecule is separated from the oxygen molecule in water ($H_2O$) which is pumped to each of the plurality of nodes 301 through a network of water pipes networked to each node 301. The energy required to pump the water to all the nodes 301 may be negligible at approximately less than 0.025% of the peak renewable power generation. Each electrolyser may act like a transformer, where within node 301 electricity and water are transformed into hydrogen gas for bulk energy transmission in high pressure pipelines to the load 302 rather than transforming the electricity from high voltage to extremely high voltage electricity and transmitting this bulk energy as electricity over overhead lines to the load as in the example of FIG. 4 described below.

Both the hydrogen and water may be pressurized and pumped through special non-metallic pipelines. In an example, the pipelines may be made of a composite reinforced polymer material comprising of a combination of plastic resins, fibre glass, carbon fibre, basalt fibre and aramid fibre (Kevlar 129), where for example multiple 24-inch pipelines rated at 100 bar will transport approximately 200 tons of hydrogen per hour (i.e. approximately 6.6 GWh of energy/hr) at a pressure of 75 bar to 100 bar with approximately less than 1% energy losses. The pipelines may be buried underground such that they are not exposed to the elements and because they are not made of metal they will not rust, will not suffer from hydrogen metal embrittlement, and any overhead lines that use the same easements will not induce stray currents and/or voltages into the pipelines. Variations to the above example(s) are possible and within the scope of this disclosure. For example, pipeline diameters may be larger or smaller than 24-inch and/or there could be more parallel pipeline runs than mentioned above with pressures greater than 100 bar.

Load 302, e.g., a renewable fuel processing plant such as an ammonia plant, like most processing plants requires a firm and steady energy supply to operate optimally 24/7, however due to the variable nature of wind and solar PV electrical energy generated upstream, large amounts of energy must be stored to maintain the necessary constant operation of the ammonia plant, as is the case for any downstream processing plant load.

In FIG. 3 the hydrogen pipeline offers the dual purpose of being both an efficient transmitter of large amounts of energy with minimal energy losses, and it acts as a hydrogen storage medium commonly referred to as 'Line Packing'. For example, the amount of hydrogen stored at 100 bar within ~3500 kms of 10-inch FRP pipeline and ~1100 km of 24-inch fibreglass, basalt fibre, aramid fibre and carbon fibre reinforced pipeline would be ~1.5 million kg being ~50 GWh of stored energy.

Hydrogen gas line packing in the pipeline may effectively decouple the variable renewable generation from the load as the load, e.g., an ammonia processing plant, may have a demand for about 93% of its total energy being hydrogen molecules. Only about 7% of the energy required to produce hydrogen for the production of ammonia based on the Haber Bosch process is required as electricity, which is a very small proportion of the total energy demand, which can easily be transmitted using standard commercially available transformers, switchgear, and overhead transmission lines available in the market today. Whilst this example specifically refers to an ammonia processing plant's hydrogen demand; the same principle applies to any load where its end product uses hydrogen or a hydrogen compound as its input demand, be it a hydrogen gas fired power station, green steel processing plant, national hydrogen gas transmission/distribution grid, or a national/regional electricity energy grid.

Figure 4:
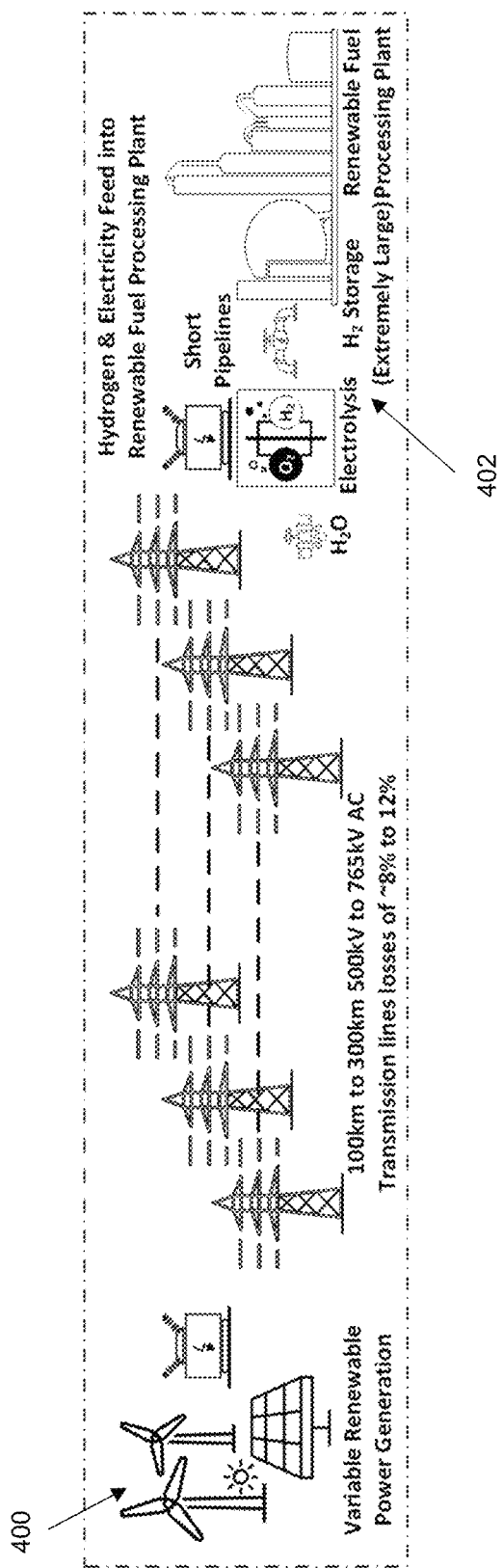
FIG. 4 shows a schematic overview of an example system for centralized hydrogen production including variable renewable generation sources only in electrical communication with a renewable fuel processing plant.

FIG. 4 illustrates an example alternative approach to generating and transmitting large scale energy, where a geographically distributed network of renewable energy generation assets comprising of wind and solar within the upstream plant 400 that captures variable solar and wind energy which is then all transformed by transformers to Extremely High Voltage (EHV) electrical energy of which all the electrical energy is transmitted as electrical energy to the centralized downstream facility 402 and where >90% of this Extremely High Voltage (EHV) electrical energy is then transformed down to a Low Voltage through a number of steps before it is fed into electrolysers to produce hydrogen or a hydrogen compound using water at downstream facility 402. In the example, 22 GW energy transfer via overhead lines to the centralized downstream electrolyser/renewable fuel processing plant. An overview of the approach shown in FIG. 4 is illustrated in system 150 of FIG. 1 electricity from renewable energy sources is transformed by transformers to EHV electricity energy for bulk electron transfer 151 to a downstream plant. In the illustrated example of FIG. 4, the overhead lines (OHL) may be 100-300 km transmitting electricity at 500-765 kV AC with transmission lines losses of approximately 8-12%. The bulk variable renewable energy transferred as electrons via the centralized downstream facility 402 where the electrolysis is located centrally adjacent to the load, i.e., centralized downstream facility 402. This may be an feasible method of feeding an electrical load where the demand was less than 6 GW and came from a firmed generation source such as pumped hydro generation, with high-voltage alternating current (HVAC) electrical transmission having a loss of about 8% to 12% depending on the AC voltage and distance, whilst with high-voltage, direct current (HVDC) electrical transmission a loss of about 3% would be expected. However, the example method of energy transfer illustrated in FIG. 4 may be inefficient and expensive in comparison to the approach illustrated in FIG. 3 for generation and transmission of large amounts of energy to a processing plant which utilizes hydrogen or hydrogen compounds. In particular, the alternative approach presents a number of challenges including:

- Transmission of greater than 6 GW of AC Electrical Energy over distance >5 km and <300 km is very inefficient, electrical losses from source to downstream plant can be >10%,
- Transmission of greater than 6 GW of DC Electrical Energy over distance <800 km is very expensive, this due to the requirement of very expensive AC-DC Converter Stations,
- Electrical energy from variable renewable energy sources such as wind and solar needs to be firmed before it can be supplied to the load (e.g., an Ammonia, Methanol or Methane plant), which may be inefficient and costly, and
- To firm variable electrical energy, the energy needs to be transformed into another state, i.e., thermal, mechanical, gravitational or chemical energy, electricity (electrons) cannot be stored in their native state.

In FIG. 4 the transmission of large amounts of energy from variable renewable generation spread over a geographical large area may require a considerable amount of electrical transmission equipment including multiple Extremely High Voltage (EHV) substations, step-up and step-down power transformers, overhead transmission lines and power Cables. The vast amount of copper, aluminium, and steel to transfer this energy is expensive, and may be inefficient due to line losses. To transform electricity at the GW scale would require some of the largest and heaviest power transformers ever manufactured, posing logistical problems for projects being developed in remote regions where there are little to no port, rail or road facilities available to transport these very large, heavy, expensive and sensitive assets.

Continuing the example in FIG. 4, the multiple Extremely High Voltage and High Voltage (HV) overhead lines may also be exposed to the elements, such as cyclonic weather, lightning and bushfires thereby requiring greater levels of redundancy in the electrical power transmission and distribution infrastructure, a necessity that further increases the upfront capital costs of the project's electrical infrastructure. The transforming of GW's of generated power at low voltages in the upstream wind turbines and solar photovoltaic skids to extremely high voltages of 500 kV to 765 kV or more, then to transform it back down to low voltages (e.g., approximately 690V) at the downstream electrolyser/renewable energy plant hundreds of kilometres away would result in substantial energy losses of between 8% to 12% of all the electrically transmitted energy. In contrast, the system illustrated in FIG. 3 may be less than 1% losses as energy is transmitted as hydrogen gas molecules or as a hydrogen compound in pipelines. The electrical energy losses may be as a result of transformer losses, thermal losses, corona losses, and/or mutual coupling losses as the electricity is transferred through all the electrical primary circuits from generation source to load destination.

Figure 5:
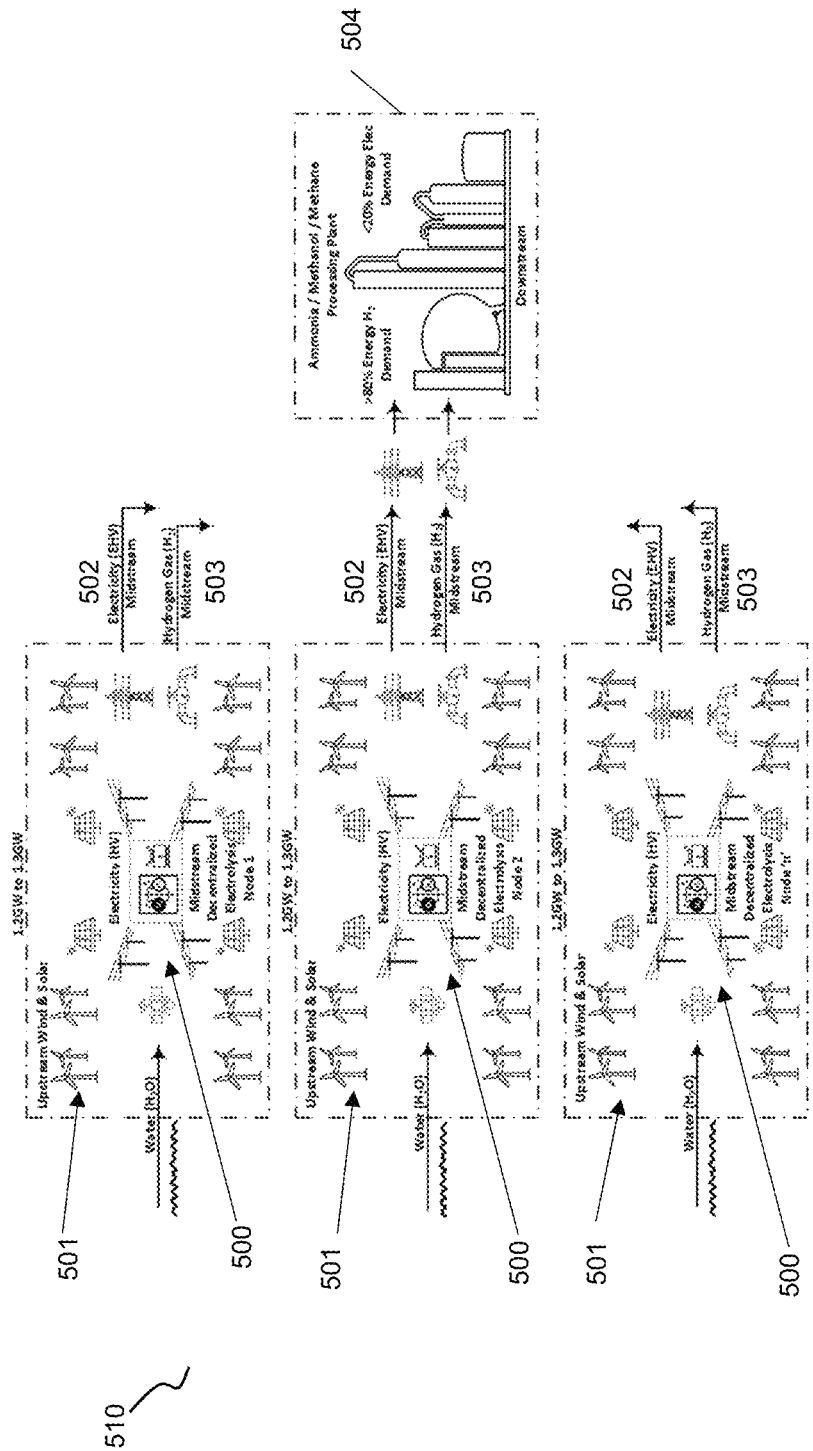
FIG. 5 shows a schematic overview of an example system includes three decentralized hydrogen production example nodes in electrical and fluid communication with a renewable fuel processing plant where electrical energy is converted into hydrogen and/or a hydrogen compound at each node.

FIG. 5 illustrates an example system 510 comprising three 1.2 GW to 1.3 GW decentralized electrolysis nodes 500 within the midstream that collect high voltage electrical energy from variable renewable wind and solar resources 501 in the upstream and transform the bulk (>90%) of this High Voltage (HV) Electrical energy into hydrogen using the water and electricity as an input to the electrolysers of each node 500 before transmitting the hydrogen gas 503 (i.e. chemical energy) from the nodes 500 to the downstream loads 504, such as a centralized ammonia, methanol, methane processing plant(s). Variable renewable wind and solar resources 501 comprise wind turbines strings and solar voltaic strings which are described in detail below. Nodes 500 may each be the same as node 300 described above, each the same features and benefits described above.

Figure 6:
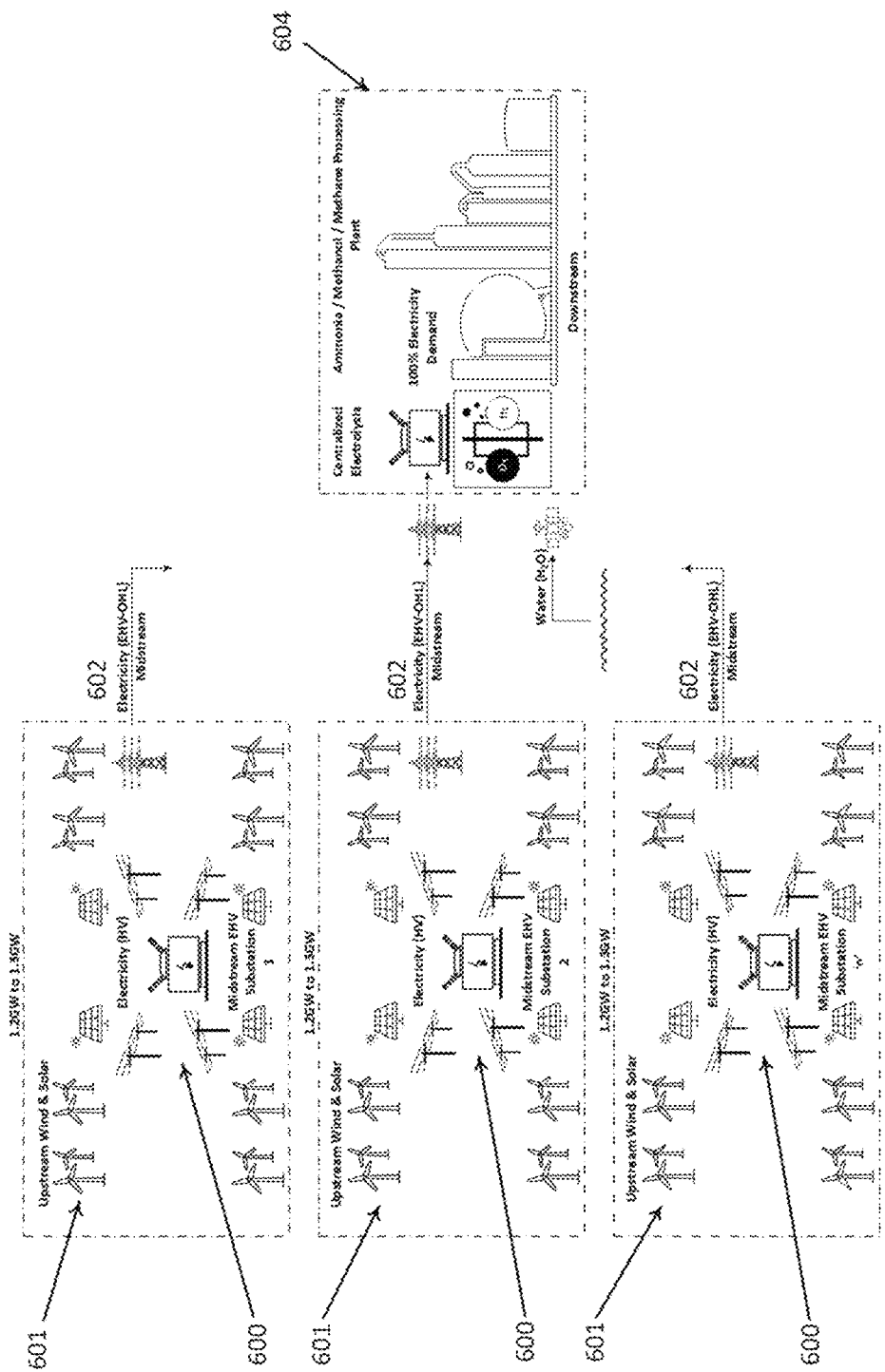
FIG. 6 shows a schematic overview of an example system that includes three example decentralized variable renewable energy generation nodes in electrical communication with a centralized electrolysis hydrogen production plant. Electrical energy is converted into hydrogen and/or a hydrogen compound at the renewable fuel processing plant.

In an example, less than 10% of the energy generated by variable renewable energy sources of system 510 is transmitted as Extremely High Voltage Electricity 502 to the downstream load 504, e.g. centralized Ammonia, Methanol, Methane processing plant. Continuing the example, 90% of the energy generated by variable renewable energy sources of system 510 is converted to hydrogen by electrolyser(s) and energy losses associated with the transmission of compressed hydrogen in pipelines 503, is approximately less than 1%. Energy losses associated with the transmission of the Extremely High Voltage Electricity over the electrical network 502, (which represents less than 10% of the energy demand) may be greater than 10%. Total energy losses for all the energy being transmitted as per FIG. 5 may be approximately less than 5%. FIG. 6 illustrates an example of three 1.2 GW to 1.3 GW decentralized Extremely High Voltage electricity generation systems 600 within the midstream that collect High Voltage Electrical energy from variable renewable wind and solar resources 601 in the upstream and transform all the High Voltage (HV) Electrical energy into Extremely High Voltage electrical energy 602 before transmitting the electricity from the midstream to the downstream load 604, e.g. an centralized electrolyser plant for the production of hydrogen as an input to the adjacent and proximate to an Ammonia, Methanol, Methane processing plant. The example shown in FIG. 4 may incorporate system 400 illustrated in FIG. 4. Energy losses associated with the transmission of energy losses associated with the transmission of all Extremely High Voltage Electricity over the electrical network to produce all the Hydrogen and in turn the Ammonia, Methanol, Methane at the downstream load 604, including the processing plant, may be greater than 10%. Electrical infrastructure costs to transmit the energy and the cost of the required hydrogen/energy storage required for firming the supply to the plant is exorbitant in comparison to the system illustrated in FIG. 5.

The collection of vast renewable wind and/or solar energy (or any other renewable energy resource) at oil and gas scale may be limited by the ratings of switchgear(s) that renewable energy sources electrically connects to at the highest possible rated voltage/current of the OEMs (Original Equipment Manufacturer) wind turbines and solar photovoltaic Inverters skids available; this limitation may be 66 kV with busbar ratings of 3,150 A to 4,000 A. Offshore wind turbines may be designed to have a maximum voltage rating of 66 kV AC whilst solar photovoltaic Skids may have a maximum voltage rating of 33 kV with their being no technical or commercial impediment for Solar photovoltaic skids to have the same rating as wind turbines at 66 kV or even greater. Switchgear ratings and voltages described therein are not limited to the above example and may exceed 66 kV.

The example systems according to this disclosure, such as the example system in FIG. 3 or example system 510 in FIG. 5, may provide Gigawatt scale energy at or above 2.5 GW. In an embodiment, the example nodal systems according to this disclosure may provide Gigawatt scale energy at or above 6 GW, which may to provide energy efficiency above centralized generation systems such the example system shown in FIG. 4. Energy efficiency may be dependent on factors such as geographic area and whether the energy demand in the downstream is predominantly hydrogen or electricity. Where renewable energy sources are distributed over a large geographic area systems according to this disclosure may have improved energy efficiency over centralized systems. In an embodiment, renewable energy sources of systems according to this disclosure may be distributed over at least 500 km$^2$. In another embodiment, the area is at least 1000 km$^2$, or at least 2000 km$^2$, or at least 6000 km$^2$. Distributing nodal systems according to this disclosure over a larger geographical area provides more available area to distribute renewable energy sources to increase energy production making nodal systems described herein more efficient in comparison to traditional centralized systems. In situations where only electricity is required in the downstream load, traditional centralized systems may be favorable as HVDC or HVAC power transfer lines may be used. However, if hydrogen or hydrogen compound is required by a load, decentralized nodal systems, e.g., a system described below with respect to FIG. 3, may be more efficient. In an example, if greater than 80% of the load demand is hydrogen or hydrogen compound, then hydrogen or hydrogen compound transmission via pipelines may provide 80% of the load energy requirement and 20% as electricity via HVDC or HVAC.

Figure 7A:
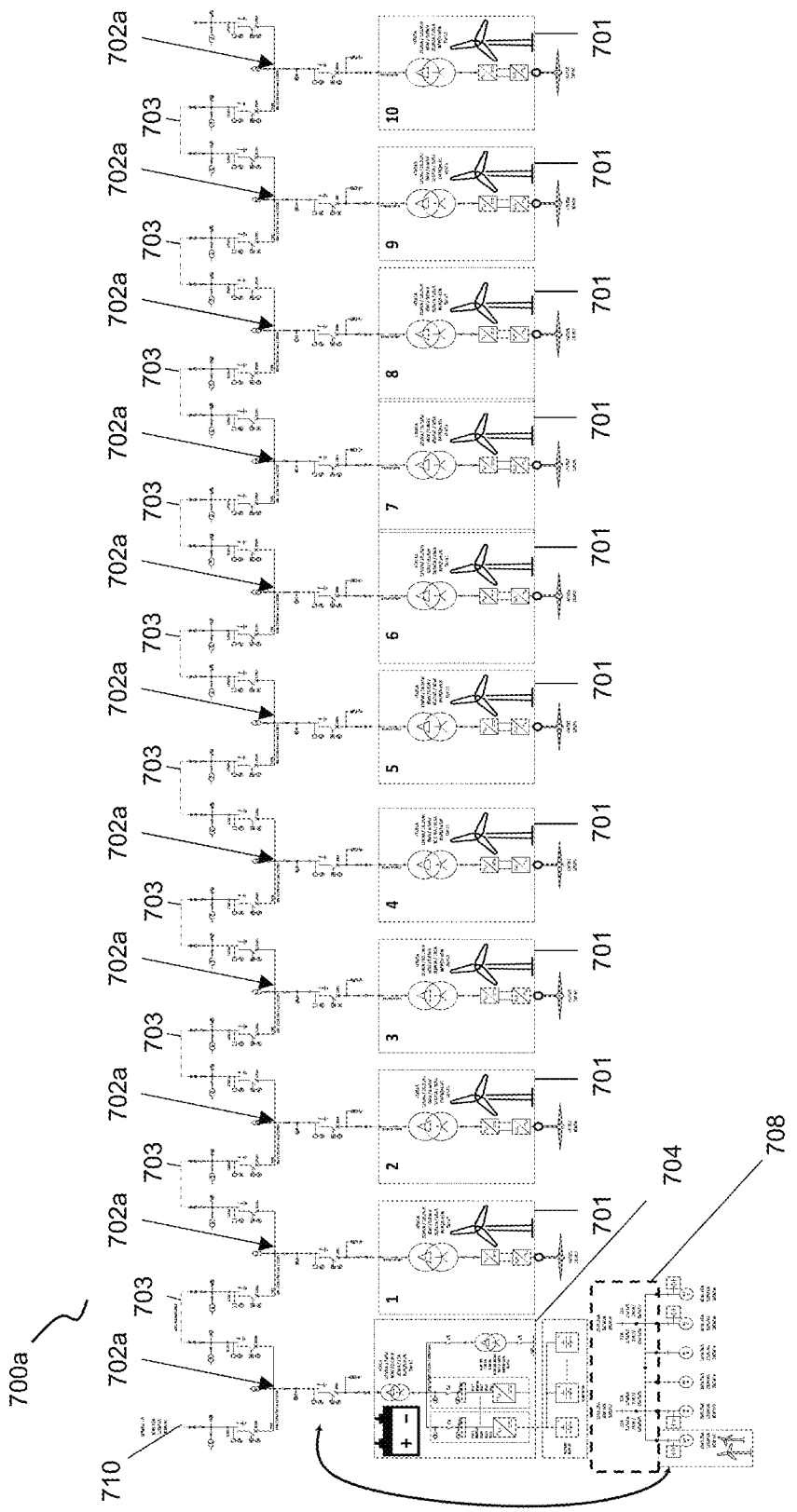
FIGS. 7A, 7B, and 7C each show schematic diagram of an example wind turbine string, solar photovoltaic string, and associated switchgears.

FIG. 7A Illustrates example 100 MW Wind Power String 700a comprising of ten 10 MW wind turbines 701 each connected through a Ring Main Unit (RMU) 702a to power cables 703, e.g. 66 kV power cables, that couples each RMU to the next, and the midstream nodal substation 708 to each wind turbine. Nodal substation 708 may be example nodal substation discussed below with respect to FIG. 8a. Each wind turbine and/or solar photovoltaic cell may provide electricity at a distributed voltage level to nodal substation 704. String 700a may comprise short term energy storage 704 for back-up power to wind turbines 701. String 700a may also be in electrical communication with a nodal substation of a node according to this disclosure, such as example node shown in FIG. 8a, via connection 710. The node may include a nodal substation having at least one electrolyser to produce hydrogen and/or hydrogen compound.

Figure 7B:
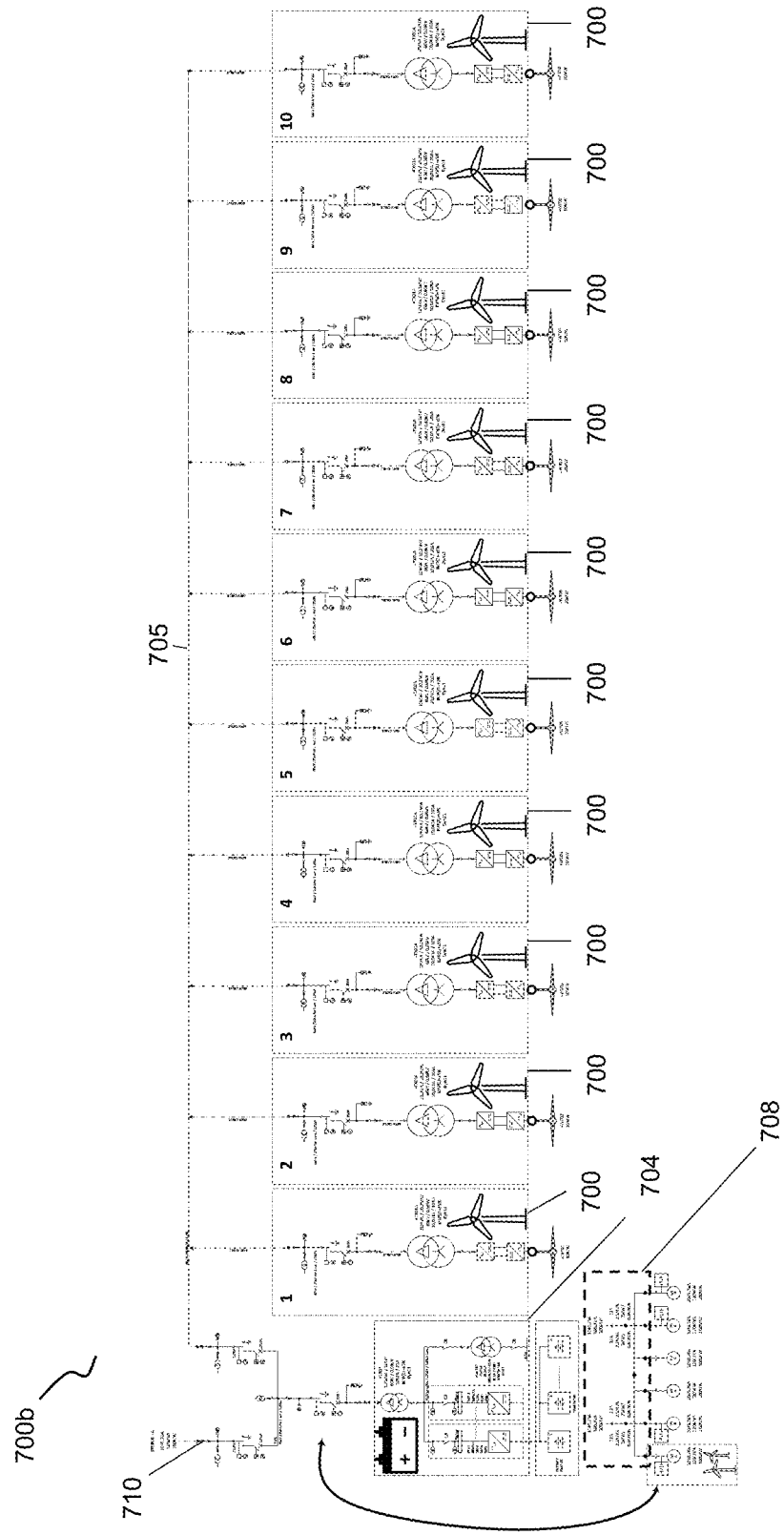

FIG. 7B is an example of a 100 MW wind turbine string 700b comprising ten 10 MW wind turbines 700 each connected to an overhead line (OHL) 705, e.g. an 66 kV overhead line, coupling a nodal substation 708 of a node according to this disclosure, e.g. example node shown in FIG. 8a, to each of the illustrated ten wind turbines via connection 710 which may be an OHL or other means of transmitting electrical energy. The node may include a nodal substation having at least one electrolyser to produce hydrogen and/or hydrogen compound. The OHL connection between wind turbines 700 may also be coupled to RMUs 702a of FIG. 7A via connection 710. Similar to string 700a of FIG. 7A, string 700b may comprise short term energy storage 704 for back-up power to wind turbine string 700b.

Figure 7C:
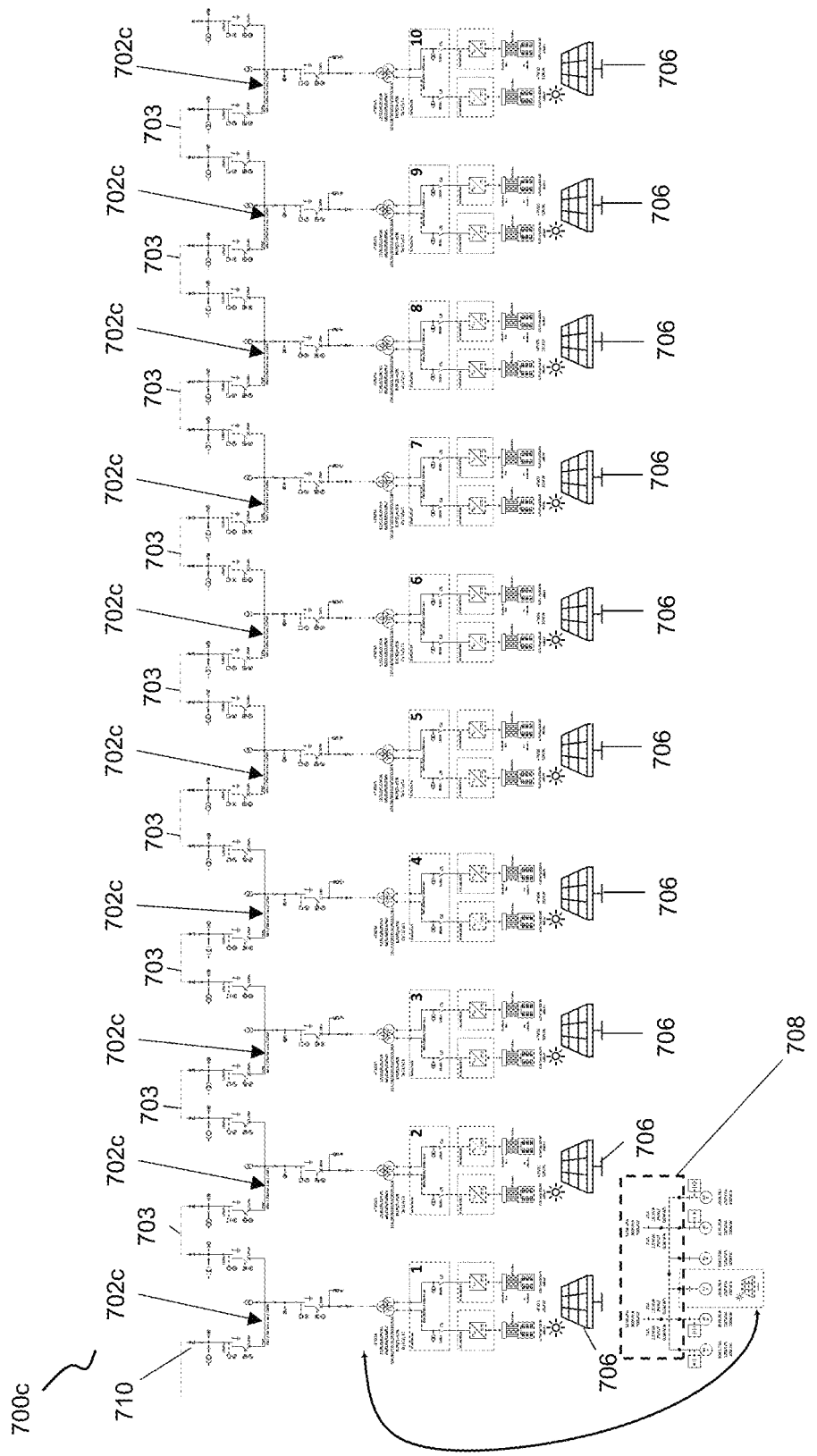

FIG. 7C is an example 100 MW Solar photovoltaic string 700c comprising ten solar photovoltaic skids 706 each connected through a Ring Main Unit (RMU) to power cables, e.g. 66 kV power cables, that couple each RMU 702c to the next. Connection 710 may couple each RMU 702c to a nodal substation 708 of a node according to this disclosure, e.g. example node shown in FIG. 8a. and RMUs 702a of string 700a and/or OHL 705 of string 700b shown in FIGS. 7a and 7b. The node may include a nodal substation having at least one electrolyser to produce hydrogen and/or hydrogen compound.

Each group of wind turbines and solar photovoltaic skids is referred to as a string in FIGS. 7A-7C. In the example, the 100 MW wind turbine string(s) and the 100 MW solar photovoltaic string, each of which may have a maximum current carrying capacity of 1,250 A at 66 kV connected by commercially available 66 kV Ring Main Unit (RMU), which may be electrically coupled together within a node at a nodal substation. In other examples, the rating of each string could in accommodate higher or lower voltages and currents.

Within each node a ratio of wind power to solar power generation may be site specific, in an example where the strings of FIGS. 7A-7C are coupled at a nodal substation the ratio is 2:1 where there is twice the amount of wind to solar photovoltaic generation. However, the ratio can vary and will be optimized to achieve the lowest levelized cost of energy/hydrogen for a system described herein. In an example, the lowest levelized cost of energy (LCOE) may be determined based on:

{(overnight capital cost*capital recovery factor+fixed O&M cost)/(8760*capacity factor)}+(fuel cost*heat rate)+variable O&M cost.

FIG. 8A illustrates a schematic of electrical connection of an example node 800 comprising (66 kV) wind strings WT & (66 kV) solar photovoltaic strings PV. FIG. 8B illustrated overhead plan view of example node 800. More specifically, node 800 as illustrated in FIG. 8A is connected to eight 100 MW wind turbine strings WT, four 100 MW solar photovoltaic strings PV. Node 800 comprises four 150 MW electrolyser trains 801, and an HV or EHV connection to load 802, e.g. an EHV connection at 220 kV to the load 802. A (66 kV) switchgear may connect to all the wind, solar strings, electrolyser trains, and ancillary loads within the node via busbars B-1, B-2, B-3, and B-4 to the 220 kV switchgear in a 'H' Configuration via two 220/66 kV/66 kV step-up power transformers 803. Both 220 kV and 66 kV switchboards depict the normal operating mode at maximum generation and demand where all bus-section and bus-coupler breaker(s) are open.

In the example illustrated in FIG. 8A, wind and solar electrically generated energy from strings WT, PV is from eight wind turbine strings and four solar photovoltaic strings each rated to 100 MW of peak power generation, each string WT, PV may be connected in node 805 onto a 66 kV switchboard divided into four zones of busbars B-1, B-2, B-3, and B-4, each with a maximum busbar current carrying rating of 3,150 A at 66 kV. Each zone defined by busbars B-1, B-2, B-3, and B-4 is connected to the other busbar zones through a Bus-Section and/or Bus-Coupler circuit breaker rated at e.g., 3,150 A, these breakers are interlocked such that the current flowing through the busbar zones when connected together at any one time does not exceed the busbar rating (e.g., 3,150 A). If two busbars connected each other start to exceed the maximum combined busbar current rating of e.g. 3,150 A (i.e. exceed 1,575 A on each of the two busbars connected), they will automatically disconnect from each other by opening the busbars respective Bus-Coupler or Bus-Section circuit breakers, or where the four busbars connected together exceed the example maximum combined busbar current rating of 3,150 A (i.e. exceed 787 A on each of the four busbars connected) each busbar will automatically disconnect from the other with all bus-sections and bus-coupler breakers opening as shown in FIG. 8a. This principle applies for any of OEM switchgear ratings according to this disclosure. If the current on an adjacent (66 kV) switchgear busbar zones drops to a level that would allow two or more of the (66 kV) switchgear busbars zones to connect without exceeding the nominal rating of the busbars current rating, then two or more of the busbar zones bus-coupler breaker and/or bus-section breaker will automatically close. In the example illustrated in FIG. 8a, 66 kV Bus-Section and bus-coupler breakers are open as the busbar rating is limited to 3150 A, if both busbars were connected there is the risk that one of the busbars could be overloaded if one of the transformers feeder breakers were to open or trip. Voltages, wattages, currents, and the number of wind turbine strings, solar PV strings, electrolysers, switchgears, and other ancillary equipment used in the examples herein are exemplary and may vary to optimize the design of the nodes according to this disclosure.

Figure 9:
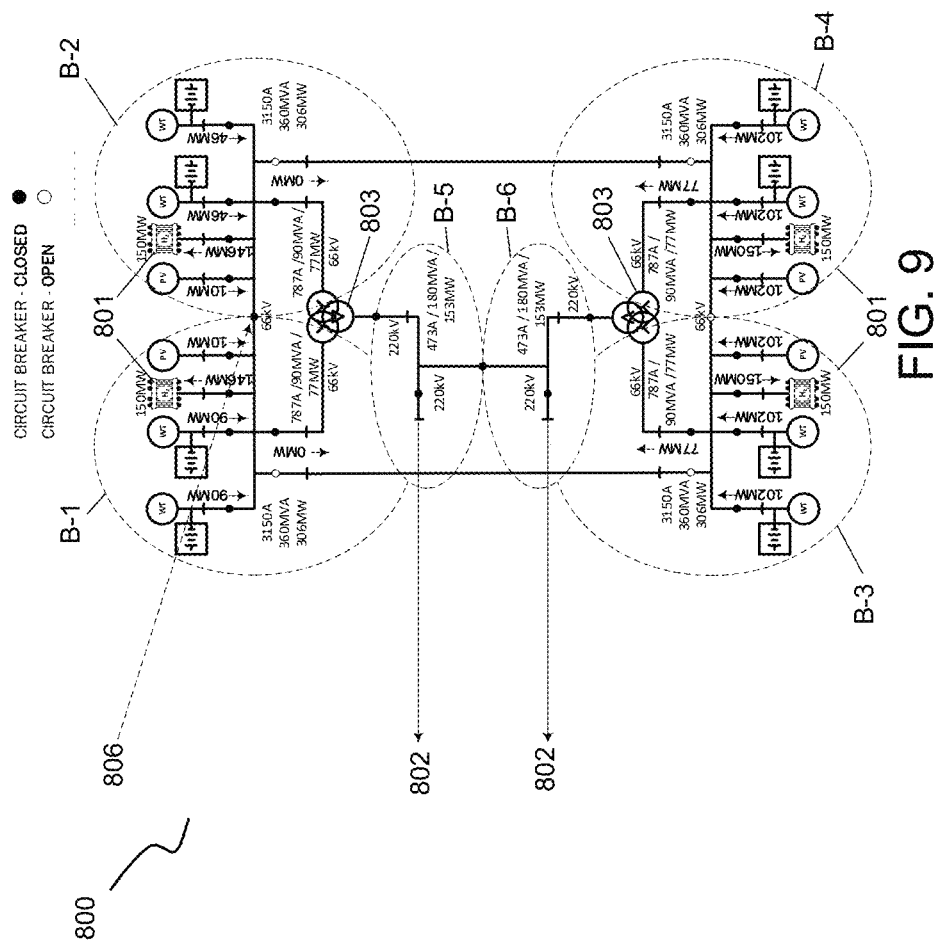
FIG. 9. shows a schematic view of the node of FIG. 8A where bus-section breaker(s) are closed and bus-coupler breaker(s) are open.

FIG. 9 illustrates node 800 shown in FIG. 8a, however bus-section breaker 806 between busbar B-1 & B-2 is closed and all other bus-sections and bus-coupler breakers are open. In the example of FIG. 9, energy generated by the solar photovoltaic string PV on busbars B-1 and B-2 is constrained due to cloud cover and the energy generated by the wind turbine strings WT on Busbar B-1 and B-2 is reduced. The closure of bus-section breaker between busbar B-1 and B-2 may be autonomous to streamline/optimize the energy delivered to the electrolyser trains (e.g. 150 MW electrolysers) on Busbar 1 & 2 without exceeding the current rating of the 66 kV Busbars 1 & 2. No power may be available to transmits downstream from B-1 and B-2 to the 220 kV network to load 802.

For the example in FIG. 9 the 66 kV Busbar B-2 power being delivered by the strings WT, PV connected to it drops to less than half, to optimize the continuous operation of the electrolyser trains 801 connected to busbar B-1 and B-2 the 66 kV bus-section breaker 806 is closed automatically. Autonomous switching connecting the busbars may balance the energy supply to all electrolyser trains 801 which may maximize their utilization for renewable generation available at any one time.

HV Connection 802 to the load, e.g., a downstream ammonia plant, may have an electrical demand from each node 800 of ~50 MW and additional capacity over and above this may be transmitted to other downstream domestic users separate from the HV connection 802 to the load. Each node 800 may be able to transmit ~300 MW of electrical energy via the 220 kV HV transmission network. In an example, additional energy, e.g., 318 MW, from busbars B-3, B-4 can be used for local nodal auxiliary loads such as compressors and energy storage and/or additional feed to busbars B-1 and B-2 via bus-coupler between busbars B-2 and B-4.

Figure 10:
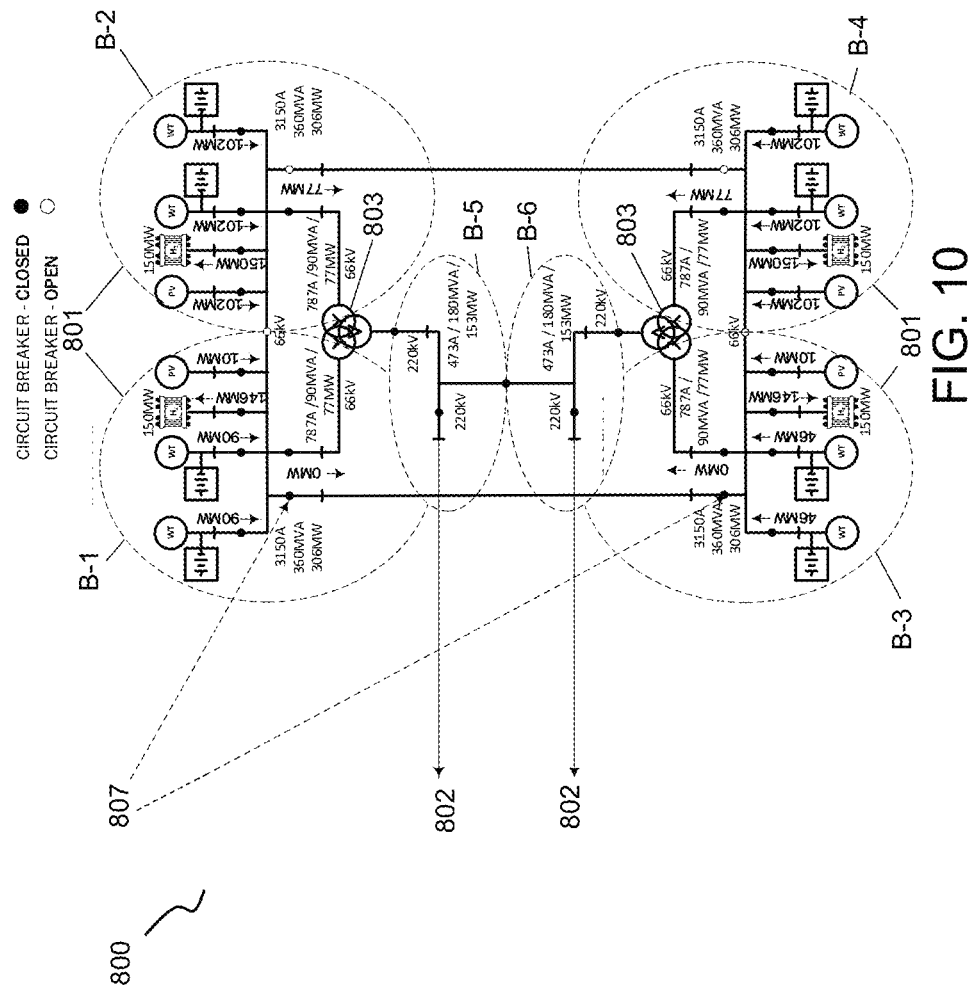
FIG. 10 shows a schematic view of the node of FIG. 8A where bus-section breaker(s) are open and bus-coupler breakers are closed.

FIG. 10 is the same switchboard illustrated in FIGS. 8-9, however in this example bus-coupler breakers 807 between busbar B-1 and B-3 are both closed and all other bus-sections and bus-coupler breakers are open, this because the energy generated by the Solar photovoltaic on Busbar B-1 and B-3 is constrained due to cloud cover and the energy generated by the wind on Busbar B-1 and B-3 has reduced. The closure of bus-coupler breakers between busbar B-1 and B-3 is autonomous, to streamline the energy delivered to the electrolyser trains 801 on Busbar B-1 and B-3 without exceeding the current rating of the 66 kV Busbars B-1 and B-3.

As shown in FIG. 10, node 800 illustrates a switchboard arrangement where the Bus-Coupler circuit breakers separating busbars B-1 and B-3 are both in the closed position to optimize the available energy being generated to supply each of the example electrolysers 801 (e.g. 150 MW electrolysers) connected to each of busbars B-1 and B-3. Continuing the example shown in FIG. 10, the 66 kV Busbar B-3 connected energy generated drops to less than half its nominal generation capacity. To optimize and maximize the continuous operation of the electrolyser trains 801 connected to both busbars zones B-1 and B-3, the (66 kV) bus-coupler circuit breakers between busbar zone B-1 and B-3 may be both closed automatically. Autonomous switching, connecting the two busbars may balance the energy supply to all electrolyser trains 801 maximizing their utilization for the renewable generation available at any one time. In an example, for node 800, when the current drops below a threshold value, e.g. a quarter of nominal generation capacity, all four zones B-1, B-2, B-3, and B-4 may then connect by closing all bus-sections and bus-couplers. This autonomous interlocked operation may be managed by the switchgear bays respective protection relay/bay controllers and the overarching energy management system. The above examples may apply to switchgear rated to 66 kV with a maximum current carrying capacity of 3,150 amps, however, the switchgears of this disclosure may apply to any suitable switchgear ratings such as at a range of lower voltages and currents or higher voltages and currents (e.g., 33 kV/2500 A to 132 kV/5,000 A).

As shown in FIG. 10, 66 kv bus-couple breakers are closed between busbars B-1 and B-3 sharing the local supply across both busbars to the connected electrolyser loads with no available power to transmit downstream over the 220 kV network from these to busbars to the load 802. The load 802, e.g. an downstream ammonia plant, has an electrical demand from each node 800 of about 50 MW and additional capacity over and above this may be transmitted to other downstream domestic user not part of load 802. Each node 800 maybe able to transmit about 300 MW of electrical energy via the (220 kV) high voltage transmission network. Busbars B-2 and B-4 may provide 318 MW of additional energy which can be used for local nodal auxiliary loads such as compressors and energy storage and/or additional feed to busbars B-1 and B-3 via bus-sections between busbars B-1 and B-2, or B-3 and B-4.

Figure 11:
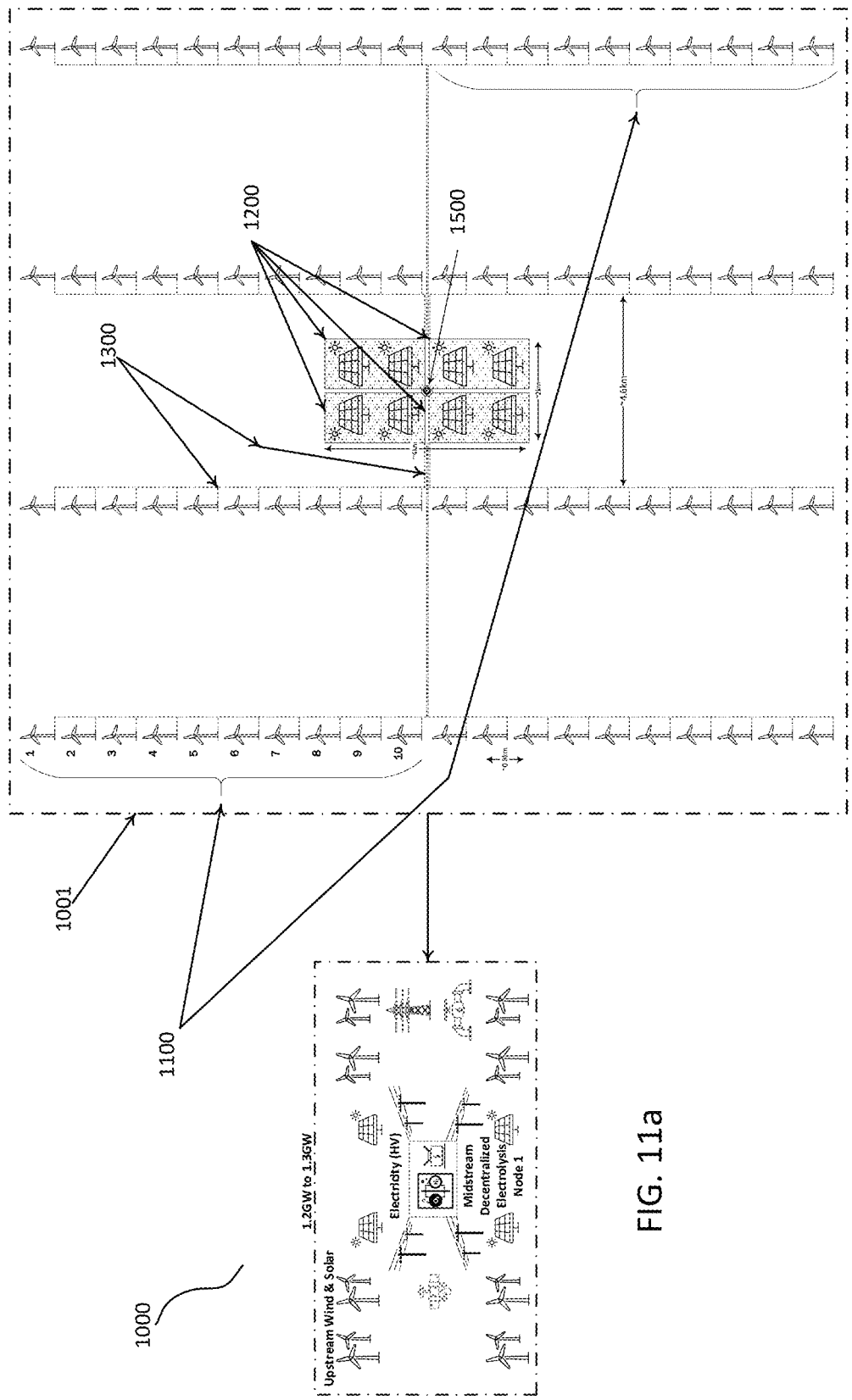

FIG. 11a illustrates an example system 1000 comprising a node according to this disclosure which may be the same system described above with respect to FIG. 5.

FIG. 11B illustrates an example overview view of the node of system 1000 shown in FIG. 11a. Nodal substation 1500 may be configured to provide 1.2 GW to 1.3 GW and be connected via power cable network 1300. e.g. 66 kV High Voltage lines, to eight 100 MW wind turbine strings 1100 and four 100 MW solar photovoltaic skid strings 1200. In this example the wind turbine strings 1100 may be about 4.6 km apart and each wind turbine within string 1100 may be about 800 m from the adjacent wind turbine. The positioning of each wind turbine is not limited to the example and may be optimized based on the location where the wind turbines are installed. Wind turbines strings 1100 may comprise 10 MW wind turbines connected to node 1000 via power cable network 1300 which may include overhead lines and power cables. Solar photovoltaic skid strings 1200 may comprise 10 MW of solar photovoltaic modules connected to the node via solar photovoltaic inverter skid ring main unit and power cable network (e.g., 66 KV). In this example, the solar photovoltaic skid strings 1200 may be about 4 km in length and about 2 km in width. The edge of the solar photovoltaic skid strings 1200 may be parallel to adjacent wind turbine strings 1100 and positioned about 1.3 km apart to prevent shadowing from wind turbines on the solar photovoltaic skid strings 1200 and solar photovoltaic modules thereof.

In the example illustrated in FIGS. 11a and 11b, nodal substation 1500 is connected to eighty 10 MW wind turbines via eight 66 kV high voltage overhead lines and/or power cable of power cable network 1300 that may terminate on a 66 kV switchgear within a 220/66 kV substation located at the centre of node 1500. As shown, nodal substation 1500 may be surrounded by e.g. four 100 MW solar photovoltaic strings, each with e.g. ten solar photovoltaic skids rated to 10 MW connected via 66 kV high voltage power cables that terminate on the 66 kV switchgear within the 220/66 kV substation located at the centre of node 1500. The quantity of wind turbines and solar photovoltaic skids within a string can vary depending on the high voltage and current carrying capacity of the switchgear from one example system 1000 to another.

In an embodiment, the renewable energy sources of each node, e.g., solar photovoltaic skid strings 1200 and wind turbine strings 1100, may define a perimeter 1001 generally shown as stippled line in FIG. 11b. Nodal substation 1500 may be defined within perimeter 1001 as shown in FIG. 11b. Other example positions of nodal substations within or on a perimeter defined by the renewable energy sources of each node are illustrated in FIGS. 13, 16-20.

Figure 12:
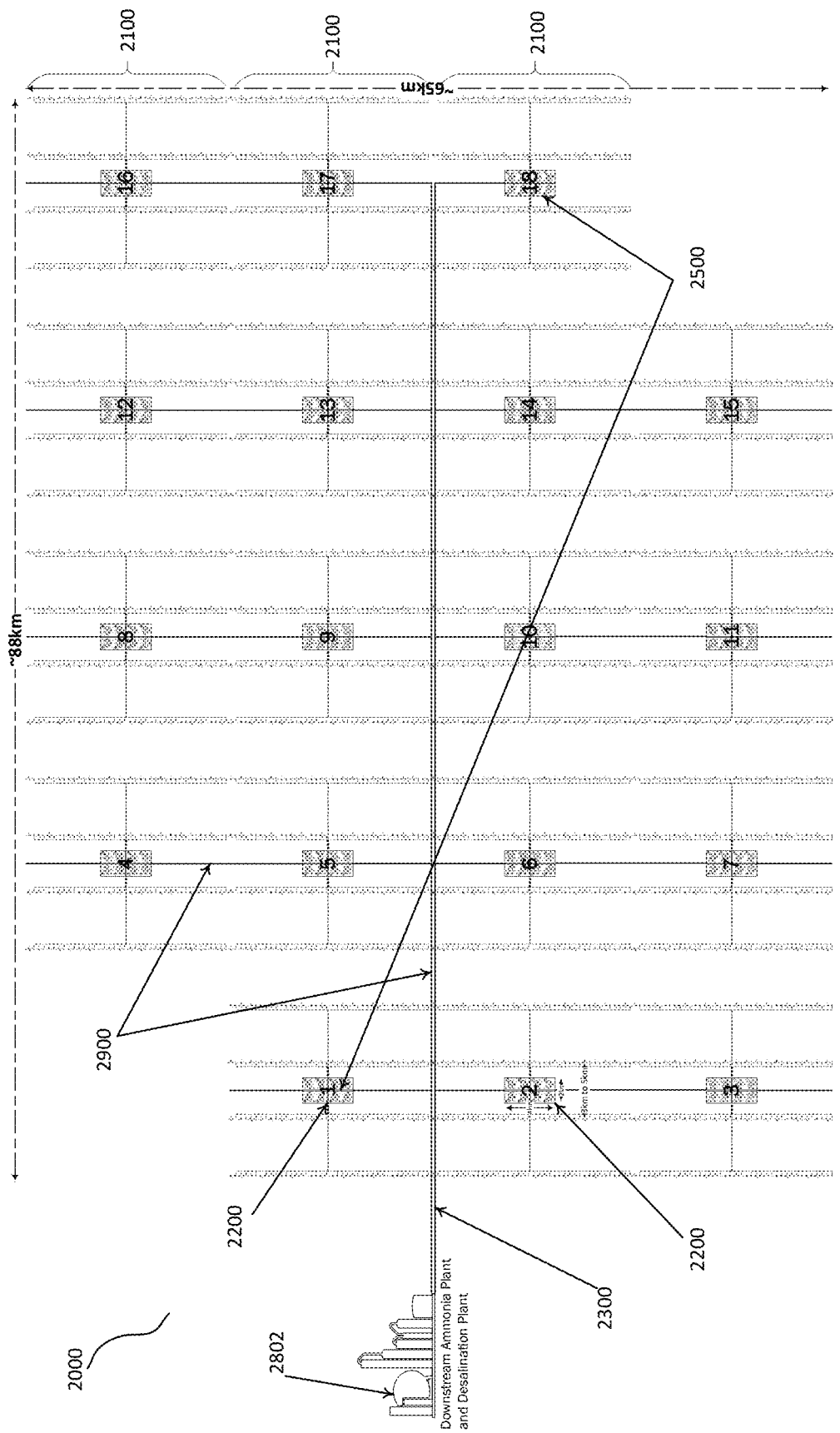
FIG. 12 shows overhead plan view of an examples nodes according to FIG. 11b which include geographically dispersed wind turbine strings and solar photovoltaic skid strings connected to their respective hydrogen nodes which are in turn connected by pipelines and overhead electrical transmission lines to a load illustrated as an ammonia and desalination plant.

FIG. 12 illustrates overhead plan view of an example system 2000 comprising eighteen nodes 2500 according to this disclosure which are dispersed over an area approximately 6,000 km². Each node 2500 may have a 1.2 GW-1.3 GW nominal peak generation capacity, totaling approximately 22 GW for the complete geographically dispersed wind turbine strings 2100 and solar photovoltaic skid strings 2200.

A plurality of nodes 2500 may cover a geographical area which may be expanded or contracted to achieve any desired energy generation. In the example illustrated in FIG. 12, there are 18 nodes 2500 covering an area of approximately 6,000 km². Each node 2500 may be rated to between 1.2 GW and 1.3 GW totaling approximately 22 GW at a power factor of approximately 0.85. The number of nodes 2500 may depend on the size and shape of the geographical land area available. Each node 2500 may comprise the features of the node illustrate in FIG. 11b. In the illustrated example of FIG. 12, each row of wind turbines may be approximately 4.6 km apart so that the wake effect is minimized between rows of wind turbines and within each row, each wind turbine is approximately 800 m apart so that their blade tip vortices between adjacent wind turbines within the row do not interfere with each other.

The centre of each node 2500 where the bulk of the generated energy may be transformed into hydrogen may be surrounded by 400 MW of solar photovoltaic skid strings 2200 and may be 2 km or less centred between the wind turbine rows that may be about 4.6 km or more apart, such that the wind turbines do not cause shadowing across the solar farms at the beginning and end of each day. The illustrated arrangement of wind turbine strings 2100 and solar photovoltaic skid strings 2200 is specific to this example and the distance between wind turbine rows and adjacent wind turbines may vary between site locations based on the wind, solar resource and geographic constraints.

Each solar photovoltaic skid string 2200 surrounding node 2500 may be approximately 4 km in length with electrical interfaces to the wind turbine string 2100 and solar photovoltaic skid strings 2200 connected to node 2500 e.g., via a combination of 66 kV overhead lines and/or 66 kV power cables in such a way that shadowing of the solar photovoltaic modules is minimized. This arrangement may be specific to this example where the distance between wind turbine rows would change the solar farm width and length due to shadowing, i.e., the solar photovoltaic skid strings may have a width shorter than it is longer if the wind turbine rows were 4 km apart.

In the example illustrated in FIG. 12, load 2802, e.g., a downstream ammonia plant, may use approximately less than 10%, e.g., 8-10%, of the energy required to synthesize ammonia as electricity which may be transmitted from nodes 2500 via power cable network 2300 such as extremely high voltage overhead lines. 90% of the energy required to produce ammonia is due to production of hydrogen—all of which is produced in the example 1.2 GW nodes 2500. Hydrogen is transmitted from nodes 2500 to the downstream load 2802 via high pressure hydrogen gas pipeline(s) 2900.

The design principles above may vary from system to system and can be configured to site specific geography and constraints, but based on the node concept described herein.

Figure 13:
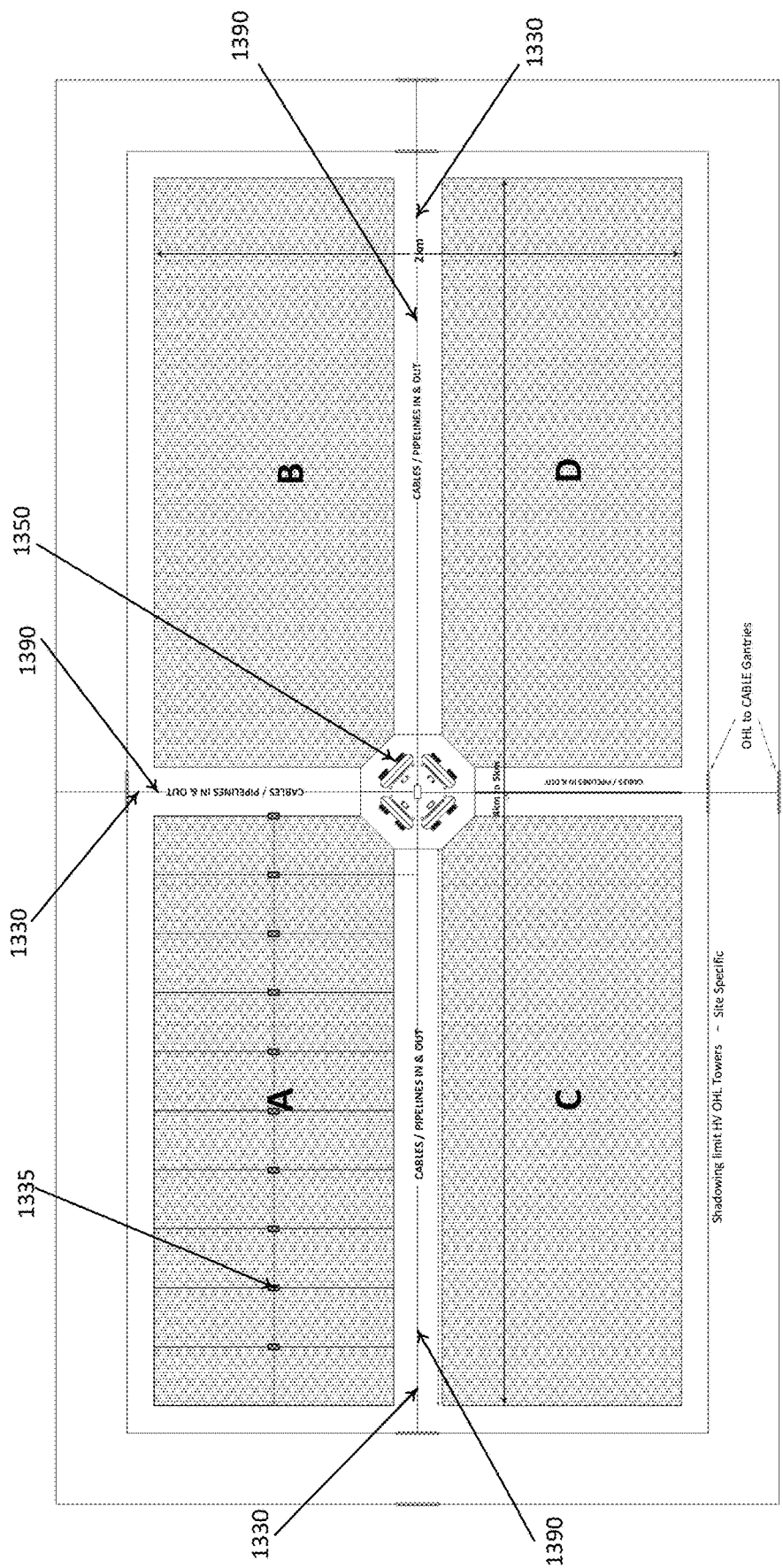
FIG. 13 shows an overhead plan view of an example node including its solar photovoltaic strings comprising four solar farms positioned generally in the shape of a rectangle with the nodal substation positioned centrally within the solar arrays.
Figure 14:
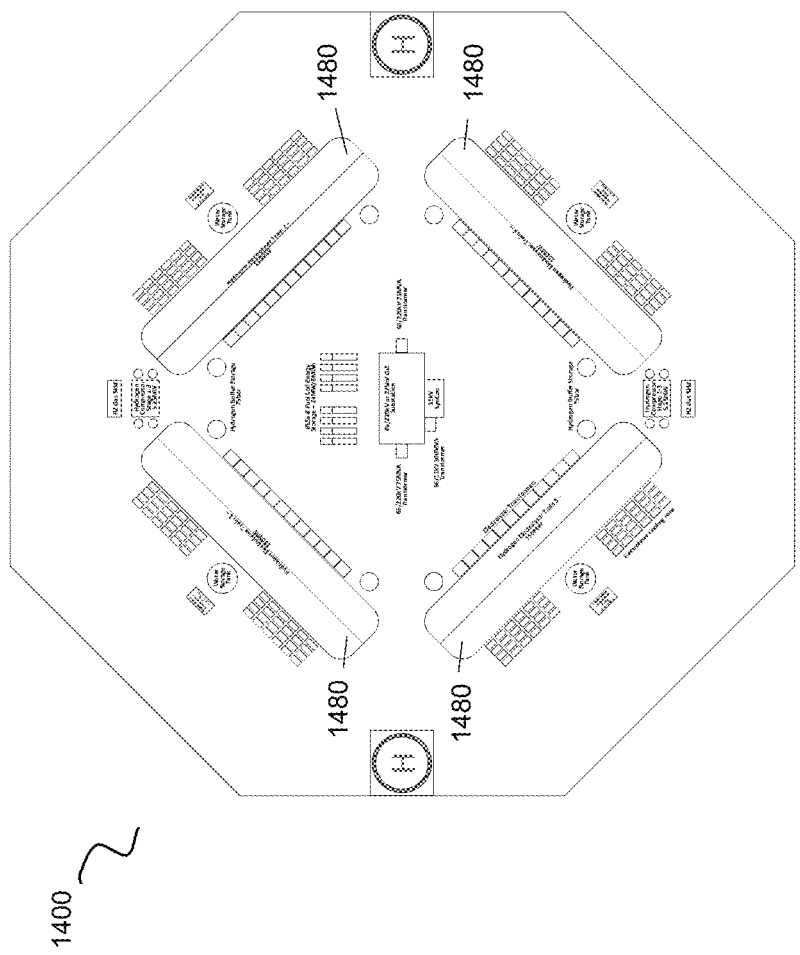
FIG. 14 shows an overhead plan view of an example node distributed over a geographic area.
Figure 16:
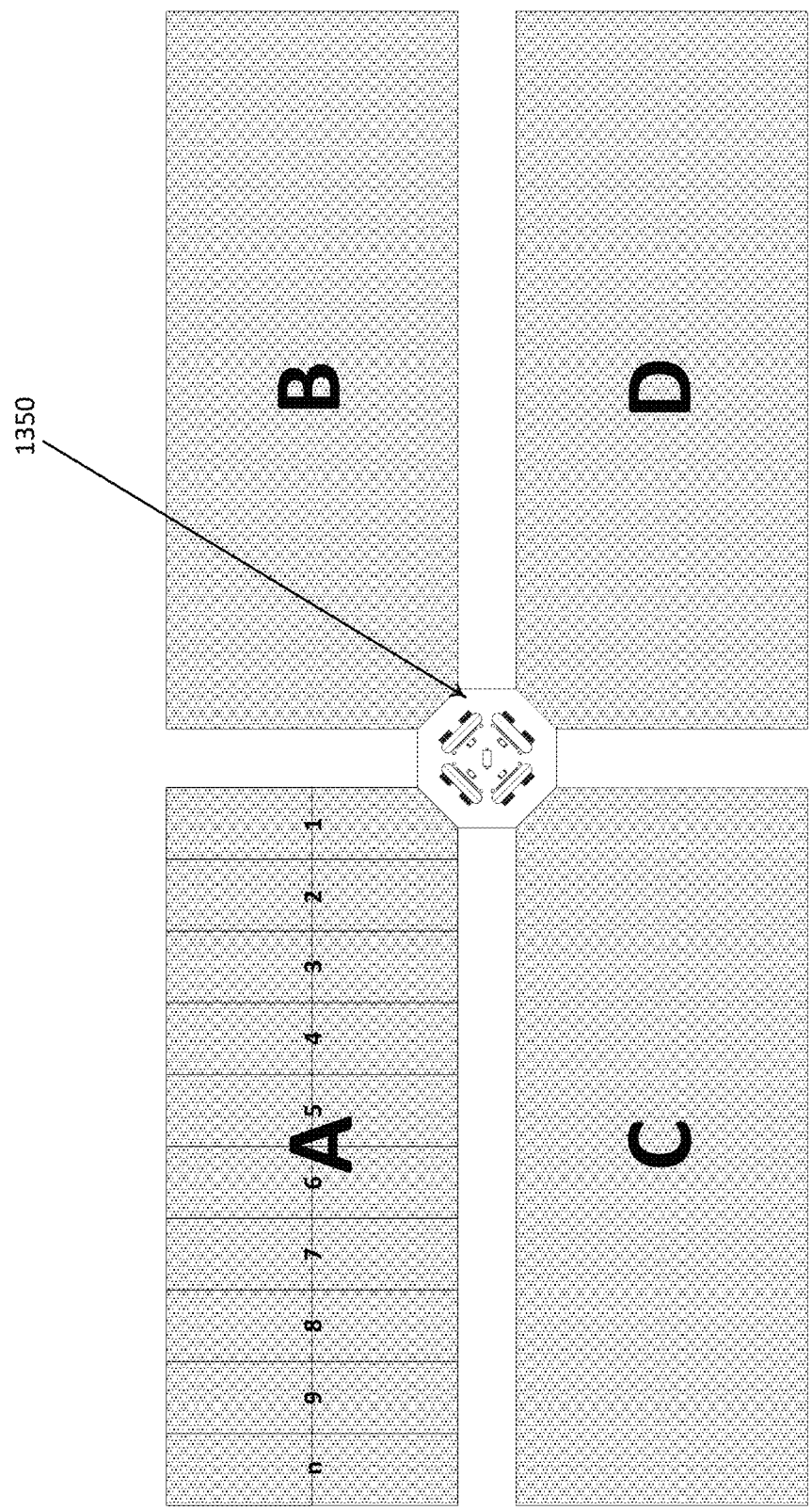
FIG. 16 shows an overhead plan view of an example node including solar photovoltaic strings comprising four solar farms positioned generally in the shape of a rectangle with a nodal substation positioned centrally within solar arrays of the solar farms. Each string may comprise 1-n number of solar array clusters.
Figure 17:
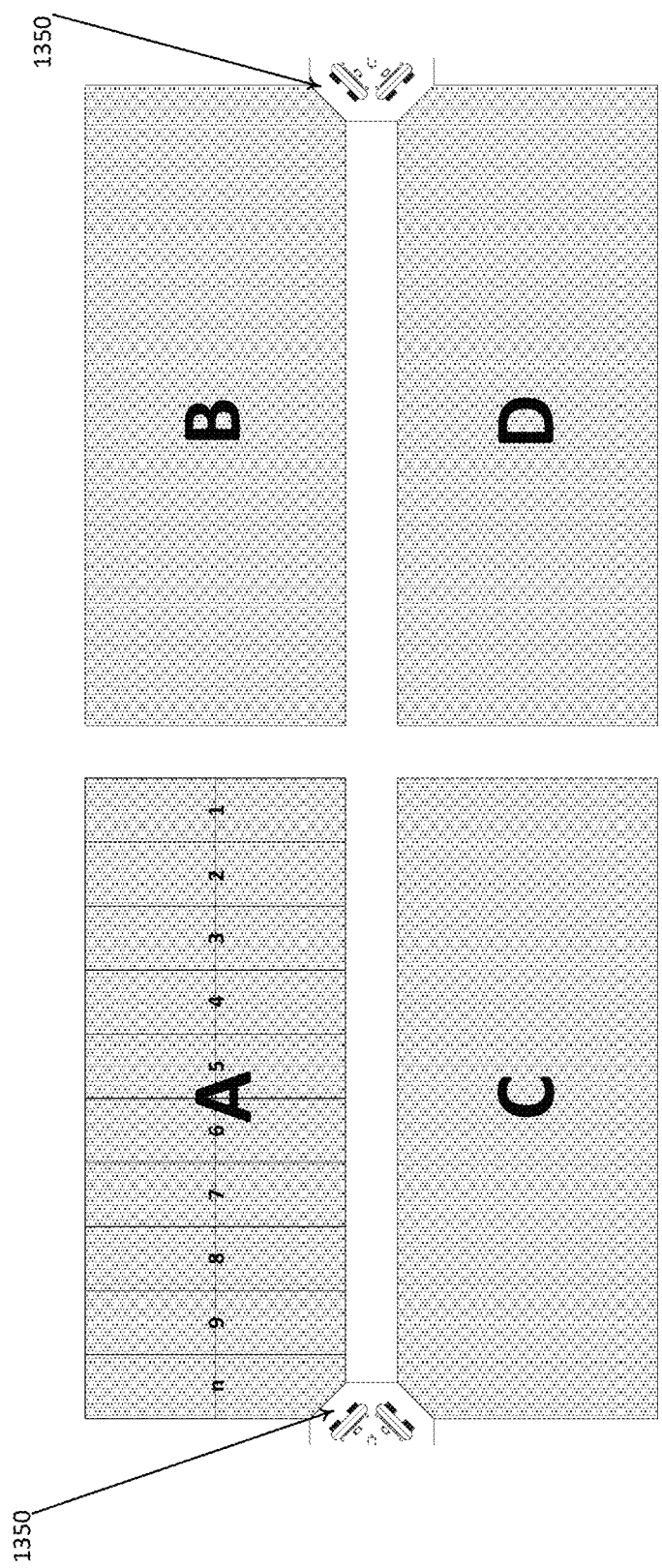
FIG. 17. shows an overhead plan view of an example node including solar photovoltaic strings comprising four solar farms positioned generally in the shape of a rectangle with a nodal substation positioned at opposing lateral edges of the solar arrays.
Figure 18:
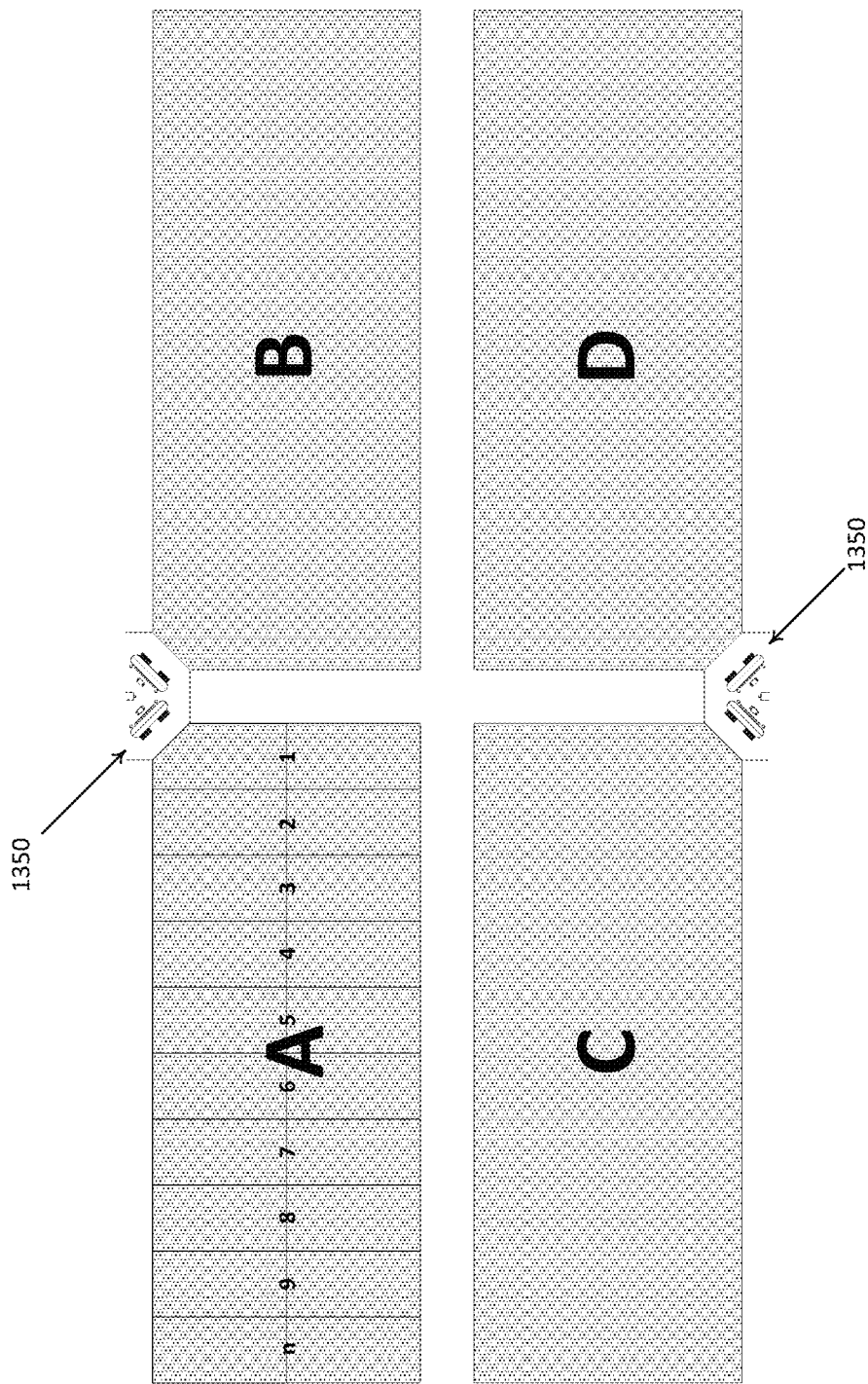
FIG. 18. shows an overhead plan view of an example node including solar photovoltaic strings comprising four solar farms positioned generally in the shape of a rectangle with a nodal substation positioned at opposing lateral edges of the solar arrays.
Figure 19:
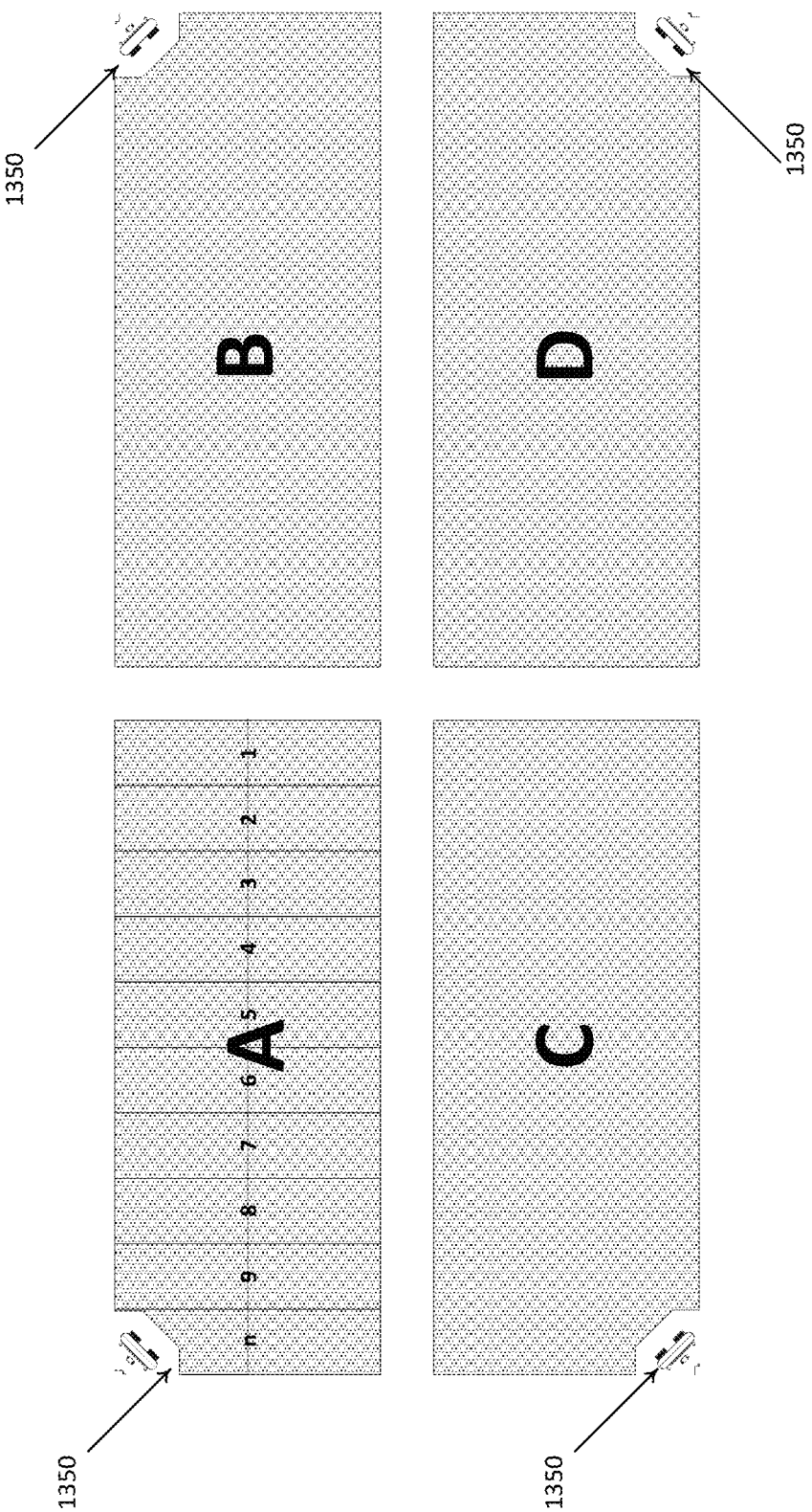
FIG. 19. shows an overhead plan view of an example node including solar photovoltaic strings comprising four solar farms positioned generally in the shape of a rectangle with a nodal substation positioned on a perimeter of each corner of the solar arrays.
Figure 20:
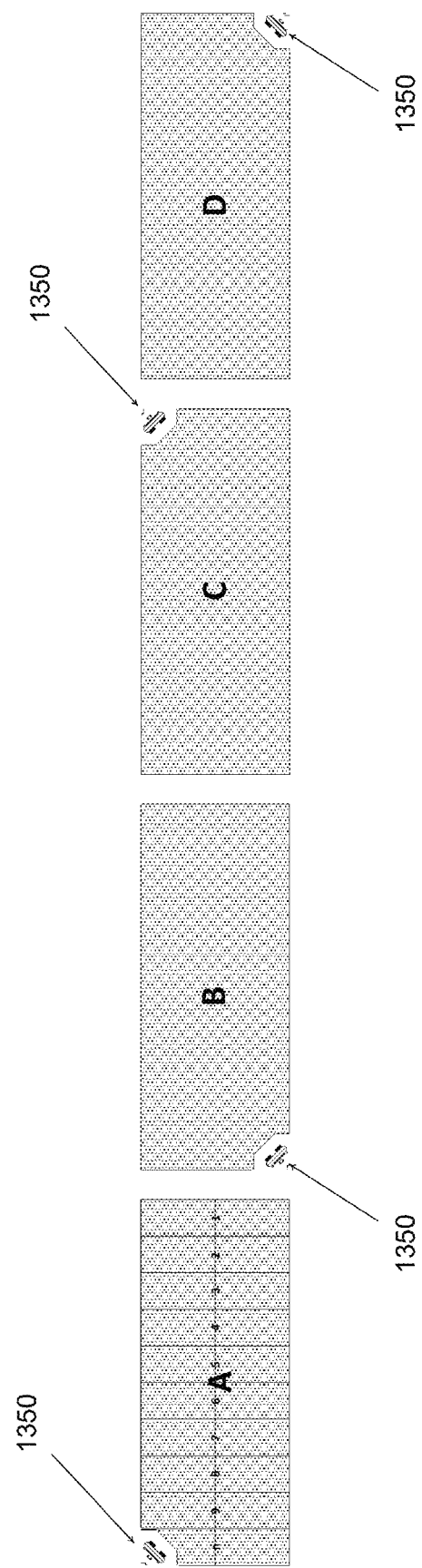
FIG. 20. shows an overhead plan view of an example node including a solar photovoltaic strings comprising four solar farms positioned in a line with a nodal substation positioned at each opposing corner of each solar array.

FIG. 13 illustrates an overhead plan view of an example 400 MW-500 MW solar farm with a nodal substation 1350 in the center of the solar farm. The position of nodal substation 1350 is not limited to the center of the solar farm. FIGS. 16-20 illustrate other example positions of nodal substations relative to the solar farms organized geographically as rectangles. FIG. 16 illustrates solar farms or concentration solar plants A, B, C, and D with a centralized nodal substation. Each solar farm may comprise a plurality of solar arrays/clusters 1-n. FIG. 17 illustrates solar farms or concentration solar plant A, B, C, and D with a nodal substation 1350 positioned at opposing peripheral edges of the solar farms A-D. FIG. 18 illustrates a solar farms or concentration solar plant A, B, C, and D with a nodal substation 1350 positioned on the opposing peripheral edges of the short sides of the solar plants. FIG. 19 illustrates a solar farms or concentration solar plant A, B, C, and D with a nodal substation 1350 positioned at each opposing peripheral corner edges of the solar farms A-D. FIG. 20 illustrates solar farms or concentration solar plant A, B, C, and D positioned laterally adjacent to each other, where each solar farm has a nodal substation positioned at a peripheral edge of the solar farm or solar plant. Nodal substation(s) 1350 may comprise a 220/66 kV substation and 150 MW Electrolyser Trains in the centre of nodal substation 1350, such the substation described above with respect to FIGS. 8a-10. In an embodiment of the example shown in FIGS. 13 and 16-20, the solar farms provide 400 MW-500 MW where each solar farm A, B, C & D comprising 100 MW solar arrays that make up the solar farms. Each solar farm may be in electrical communication with nodal substation 1350 via power cables 1335 which transmit electricity emerged by the solar arrays to nodal substation 1350 over a distance. The greater the geographical distance that electricity travels via power cables 1335 from the point of generation to the nodal substation 1350 may proportionally increase line loses associated with transferring electricity from each solar arrays. Nodal substation 1350 may be positioned to minimize line losses from solar photovoltaic strings comprising the solar farms A, B, C, and D. Nodal substation 1350 may be in electrical communication with other nodes such as the arrangement of nodes illustrated in FIG. 12. Similarly, nodal substation 1350 may be in fluid communication with a load and other nodes via pipelines 1390. For example, nodal substation 1350 may be a nodal substation of a node 2500 in system 2000 illustrated in FIG. 12. FIG. 14 illustrates an overhead plan view of an example nodal substation 1400. Nodal substation 1400 may provide 1.2 GW to 1.3 GW with four 160 MW Electrolyser Trains. FIG. 14 illustrates additional details of example nodal substation 1400, including four electrolyser trains 1480, 220/66 kV Substation, Battery Storage, Fuel Cells, Compressor Stations and other electrical balance of plant (EBoP) and mechanical balance of plant (MBoP). Example nodal substation 1400 may be example a substation of node 800 illustrated in FIG. 8b or other nodes described herein. The layout and size of a node is not limited to the illustrated embodiment in FIG. 14 Each nodal substation may comprise the following elements, which are also represented in FIG. 14 which illustrates a schematic diagram of example nodal substation 1400:

- 66 kV Gas Insulated Switchgear board
- 132 kV or 275 kV Gas Insulated Switchgear
- 6.6 kV Gas Insulated Switchgear board
- 150 MVA 66 kV/132 kV or 66 kV/275 kV winding step up Power Transformers
- 20 MVA 66 kV/6.6 kV winding Power Transformers
- 20 MVA 66 kV/6.6 kV winding Power Transformers—(Compressor Stations)
- 50 MVA 66 kV/6.6 kV winding Power Transformers—(Synchronous Condensers)
- 1.5 MVA 66 kV/0.415 kV winding Auxiliary Transformers—(Substation Aux Loads)
- 70 MVAr Synchronous Condenser+Flywheel
- 10 MW 66 kV/0.69 kV winding Power Transformers—(Electrolyser Loads)
- 20 MW Electrolyser Modules across each Electrolyser Train
- 690V Air Insulated Low Voltage Switchgear Boards
- groups of 20 MW AC/DC Converters
- 0.5 MVA 66 kV/0.415 kV winding Auxiliary Transformers—(Electrolyser Trains)
- 5.5 MW 3 Stage Hydrogen Compressor Stations
- Hydrogen Gas Terminal Skids
- 3 MW/1 MWh Battery Storage Solutions
- 1 MW Hydrogen Fuel Cell plants Electrolyser Cooling Water Plants—(Cooling Fans/Absorption Chillers)
Water Purification Plants—(Demineralization/Ultraviolet/Filtering)
75 KW Water Pumping Stations
3-ton 200 bar Hydrogen Buffer Storage Tanks.
De-Oxo Hydrogen Drying Plants
Hydrogen Dry Bed Tanks
100-ton Demineralized Water Storage Tanks
Reject Water Evaporation Ponds
Electrolyser Train Buildings
66 kV/132 kV or 275 kV Substation
Main 1 & Main 2 Back-up 110V DC Battery Storage
Main 1 & Main 2 Back-up 48V DC Battery Storage
Main 1 & Main 2 Back-up 110V DC/240V AC Inverters
66 kV/132 kV or 275 kV Substation Protection Control Automation System
6.6 kV Synchronous Condenser Protection Control Automation System
Electrolyser Process Control Systems
Helicopter/Drone Landing pads In the example shown in FIG. 14, nodal substation 1400 may electrically communicate with at least 1.2 GW of variable renewable generation through 66 kV overhead lines and/or power cables and in turn connect to 132 kV or 220 kV or 275 kV overhead lines through 132 kV/66 kV or 220 kV/66 kV or 275 kV/66 kV step-up power transformers that feed a load, e.g. a downstream renewable fuel processing plant such as a Green Ammonia, Green Methanol, Green Methane plant and/or any other type of domestic load. A load, such as a downstream renewable fuel processing plant may require 7% to 10% of the total energy required by the electrolysis to produce hydrogen within the nodes as electricity. The bulk of the energy generated by the wind turbine and/or solar photovoltaic strings is used to transform water into hydrogen within each geographically dispersed node with the hydrogen compressed and transmitted to the load through pipelines. Voltages used in the examples of this disclosure are described as between 33 kV and 275 kV and for nodal ratings of between 0.6 GW and 2.6 GW; however, voltages may change depending on the switchgear ratings of each node.

Approximately 90% of the 1.2 GW-1.3 GW of renewable generation that is connected to nodal substation 1400 via the 66 kV overhead lines and power cable strings may be fed directly to the four 140 MW-160 MW electrolyser trains 1480 within nodal substation 1400, where the electricity may be transformed into renewable hydrogen via electrolysis and by optimizing the electrolyser assets utilization to greater than or equal to 80% as possible. This same principle above applies to different sized nodes which may comprise 50 MW to 320 MW electrolyser trains.

Each node may be connected to the load, e.g., a downstream renewable fuel processing plant, such as a Green Ammonia, Green Methanol, Green Methane plant, via multiple-high pressure Fibre Reinforced Polymer (FRP) Pipelines. These pipelines may be rated to transmit multiple tons of hydrogen per hour from each node to the load at pressures of between 30 bar and 200 bar or more.

In the electrolyser trains, hydrogen may be split from water ($H_2O$) through the process of electrolysis. Water may be delivered to each node in High Density Polyethylene (HDPE) pipeline which may deliver this water as either demineralized/deionized water, potable water or sea water from the sea directly or a downstream desalination/demineralization plant close to the coast. Each node may use millions of litres of demineralized/deionized water per day when operating at full capacity, which may depend on electrolyser train ratings and the available renewable power being generated at any time. Water provided to each node is illustrated in FIG. 5.

Figure 15:
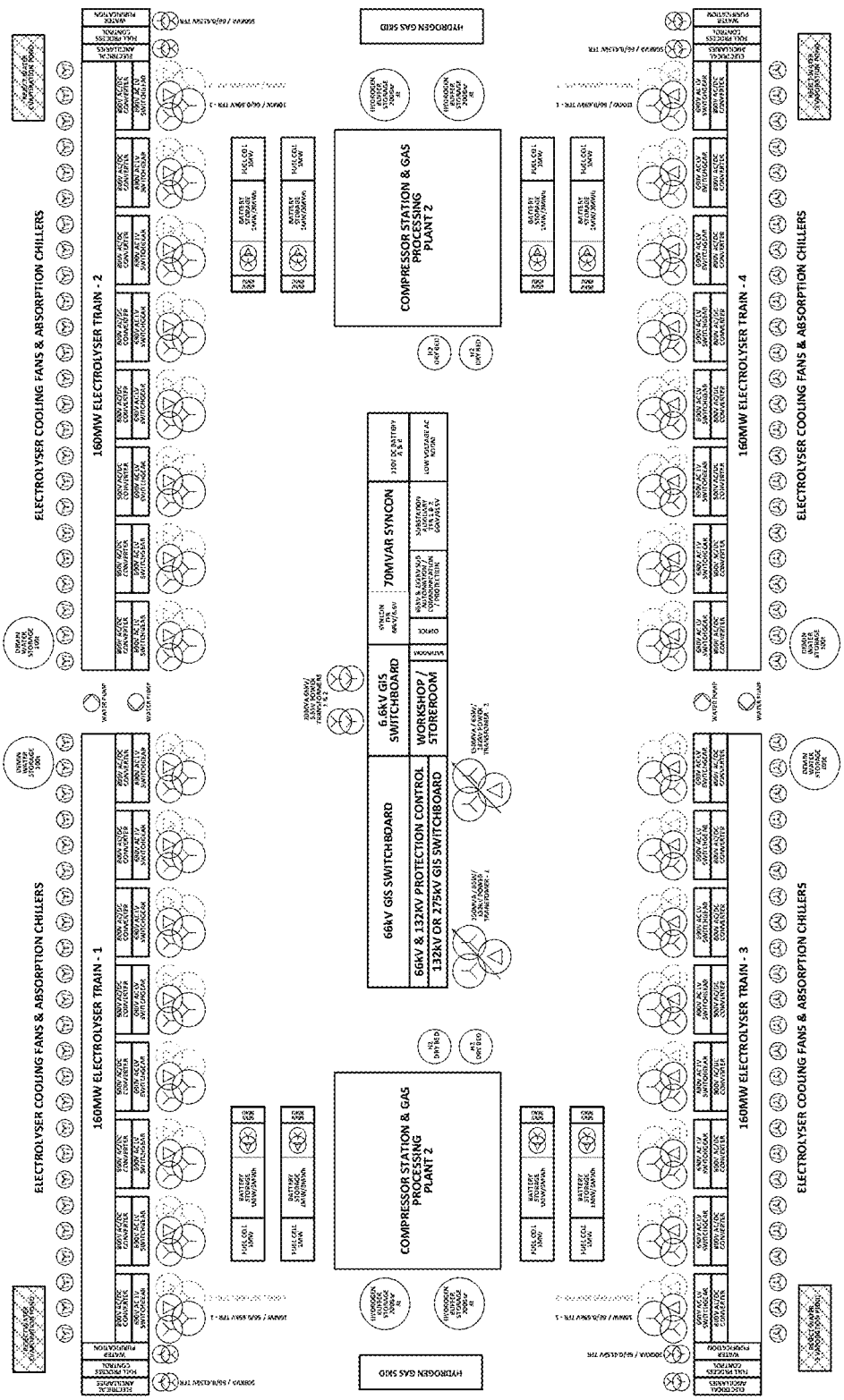
FIG. 15 shows a schematic diagram of equipment that makes up an example node of FIG. 14.

FIG. 15 illustrates example assets that may make up a node according to this disclosure.

Multiple nodes may be in electrical communication via EHV or HV overhead lines (OHL) through switchgear, such as Gas-Insulated Switchgear (GIS), Highly-Integrated Switchgear (HIS), or Air Insulated Switchgear (AIS), with the OHL capacity of between 200 MW and 2000 MW or more. In an example, two or more nodes may be connected in a nodal string. Each of nodal strings may be connected to a 132 kV or 275 kV step-up power transformer to 500 kV or 765 kV at a 500 kV or 765 kV GIS terminal substation. This example is specific, variations on this are project dependent and vary based on the site-specific geography and constraints.

All nodes may be connected electrically through the EHV or HV overhead lines to a substation, e.g. Gas-Insulated Switchgear ("GIS") substation at the load so that if any node or combination of nodes within a nodal string is constrained in its renewable generation due to cloud cover and/or reduced wind over any area of the site, renewable energy from the other nodes in another area of the site can supplement some or all of the difference, by back feeding into the nodes that are experiencing the constraint via the GIS terminal substation.

If the load, e.g., fuel processing plant (Green Ammonia, Green Methanol, Green Methane) is remote, e.g., greater 200 km from the nodes, a GIS terminal substation, e.g. a 500 kV or 765 kV GIS substation, may be positioned at the perimeter of the nodes to connect to the downstream terminal substation via OHLs, e.g. multiple 500 kV or 765 kV OHLs, and any other domestic loads. For example, the transmission of 4 GW of electrical energy over a distance of 300 km may require four 500 kV feeders on two separate 500 kV OHL tower easements, each circuit with a capacity to transmit ~1200 MVA of electrical energy. This example is specific, and variations on the positioning of substations and line voltages will be project dependent and vary based on the site-specific geography and constraint. The OHL voltages may vary from the 500 kV or 765 kV, the downstream demand could be smaller or greater than 4 GW and each OHL circuit could carry more or less than 1300 MVA depending on the voltage and the distance.

According to this disclose, variable renewable wind and solar resources may be transformed to hydrogen molecules (i.e. chemical energy as a gas) within the electrolyser trains of each node, and is transmitted to the load under high pressure through composite hydrogen pipelines. In the examples illustrated in FIG. 12, 18, nodes may each connect via two to three FRP pipelines to a gas terminal station adjacent to the perimeter of the of the renewable energy sources, if the load plant is greater than 200 km away from the variable renewable wind and solar resources. The hydrogen collected from all the nodes at the gas terminal station is may then be further compressed by booster compressors to between 75 bar and 100 bar into 24-inch-high pressure Fibreglass, Basalt, Aramid, Carbon Fibre Reinforced pipelines with the capacity to carry ~200 tons of hydrogen per hour. The size and pressure described in this example are not limiting and may change depending on site-specific geography and constraints, e.g., the pipeline diameters could be larger or smaller than 10-inch and/or 24-inch and/or there could be additional parallel pipelines runs over and above what is mentioned with pressures even greater than 100 bar.

Figure 21:
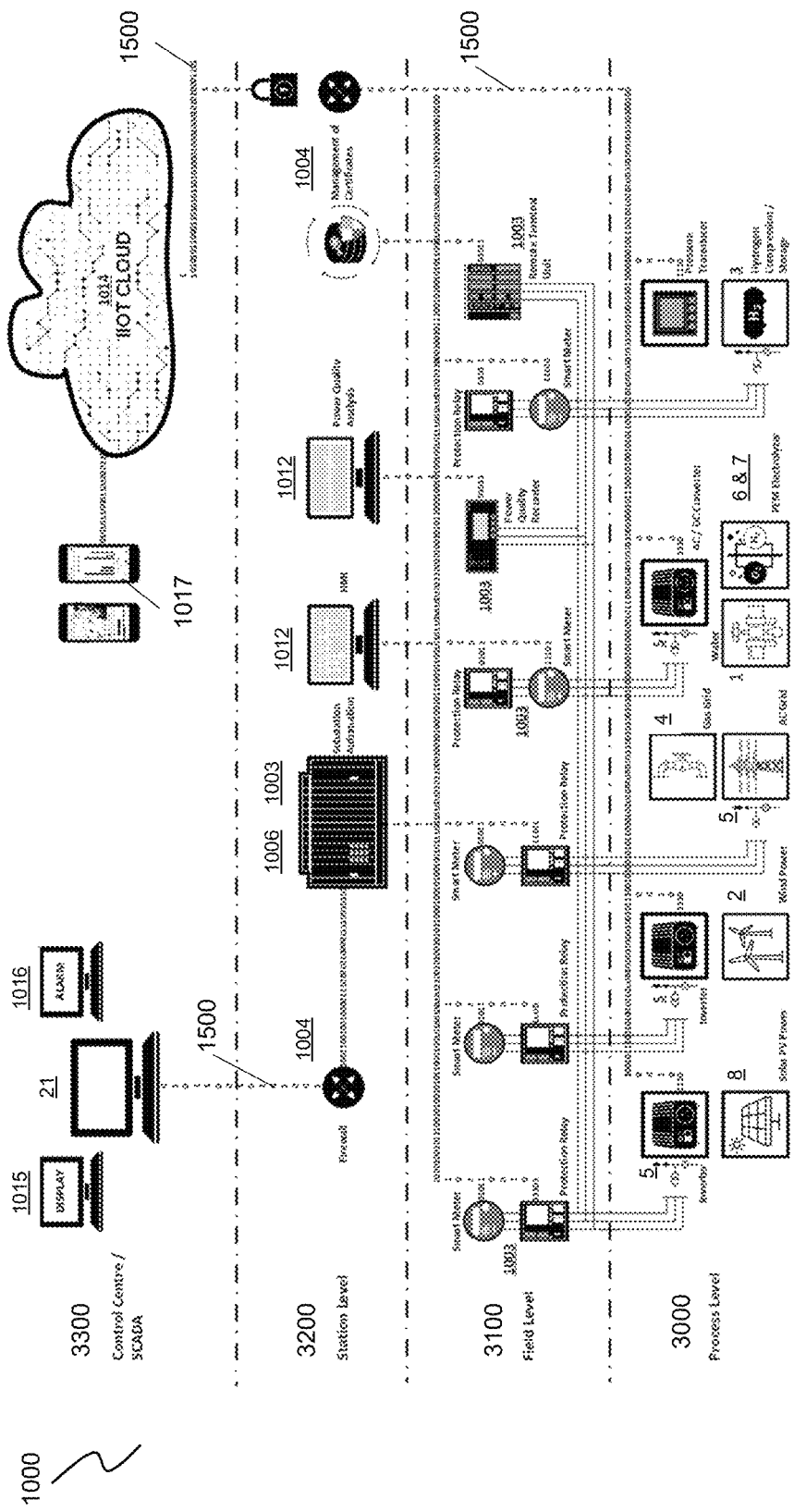
FIG. 21 illustrates a schematic diagram of a system for controller a system for collecting, generating, and transmitting Gigawatt scale energy from a plurality of distributed sources.

FIG. 21 shows a schematic view of an example system 1000 for controlling a system for collecting, generating, and transmitting Gigawatt scale energy from a plurality of distributed sources dispersed over an area. Large scale renewable hydrogen production plants may be very remote and geographically dispersed over very large areas. Due to the remoteness of the renewable energy generation and the hydrogen or hydrogen compound production nodes, system 1000 may allow for full autonomous and remote control of the upstream renewable energy generation and midstream nodes. All equipment of system 1000 may have intelligent electronic edge devices that gather data that may be used for control, measurement and protection of the renewable energy generation and the hydrogen production nodes. Data gathered from system 1000 may be an input to a digital twin software model of physical plant and may be used to test alternative operating regimes, other emerging technologies and assess whether the overall system is operating at its optimum.

FIG. 21 illustrates four levels of control, the process level 3000 being physical process equipment and sensors thereon, the physical equipment including the energy and/or hydrogen/hydrogen compound generation equipment or equipment of the load. Sensor may include smart edge devices like inverters, merging units, transducers, Non Conventional Instrument Transformers (NCIT), Current transformers (CT) & Current transformers (VT) that may interface directly to the process equipment of the generation equipment or equipment of the load to gather digital and analogue data for control of equipment including wind turbines, solar photovoltaic inverters, hydrogen compressors, electrolysers, motors, met-masts, etc.

The next control level, is Field Level 3100 which may comprise intelligent electronic devices (IEDs)/microprocessors, e.g., protection relays, metering & measurement devices, managed ethernet switches, remote terminal units, programmable logic controllers, etc. These IEDs may have communication interfaces supporting high speed redundant ethernet communication using standardized communication protocols with advanced programmable logic/algorithm capabilities. At Field level 3100 all data packets may be timestamped in real-time i.e. at less than 1 msec, and recorded. Time critical autonomous operations to protect and measure the system may be done at Field Level 3100.

Station Level 3200 gathers data from the Field Level and Process Level to make system wide decisions such as operational interlocking, load shedding, control, Local Human Interface (HMI), software engineering/parameterization, power quality and user access authentication and security management of certificates. At the Station Level there is also the ability to do local control via the local HMI, be it is in the Wind Turbine or a Substation or in a Electrolyser Train.

The Control Centre/SCADA level (3300) may be a remote offsite control centre for the overall supervisory, control, and data acquisition of system 1000. Control centre(s) 3300 can be situated geographically anywhere in the world. System 1000 may be designed to operate autonomously; however, all measured data may be available for a visual inspection and manual control of system 1000. All measurement data at every sensor point within system 1000, and the status of equipment, alarms, events, trends may be received by and stored within a data system 1003. An operator may also be able to control of some or all of system 1000 and from the SCADA 3300 may be able to isolate and interrogate devices or systems before deploying maintenance staff to site. The components of system 1000 may have closed circuit television (CCTV), both visual and thermal imaging, gas detectors, pressure measuring, etc., to provide additional data on the operation of system 1000 from the Control Centre 3300 whether the site is unmanned or whether staff are deployed to site for maintenance reasons.

Sensor data acquired from process level 3000, field level 3100, station level 3200, and control centre/SCADA 3300 may be received by an Industrial Internet of Things (IIoT) Cloud platform 1014 (i.e., a Data Lake) where the data may be used by applications to optimize reporting on operational trends, efficiency trends, condition based monitoring, the levelized cost of energy (LCOE) trend over time, the levelized cost of hydrogen (LCOH) trend over time, etc. The applications may be housed on mobile devices 1017 providing easy access to asset owners, investors, operators, accreditation agencies etc.

Figure 22:
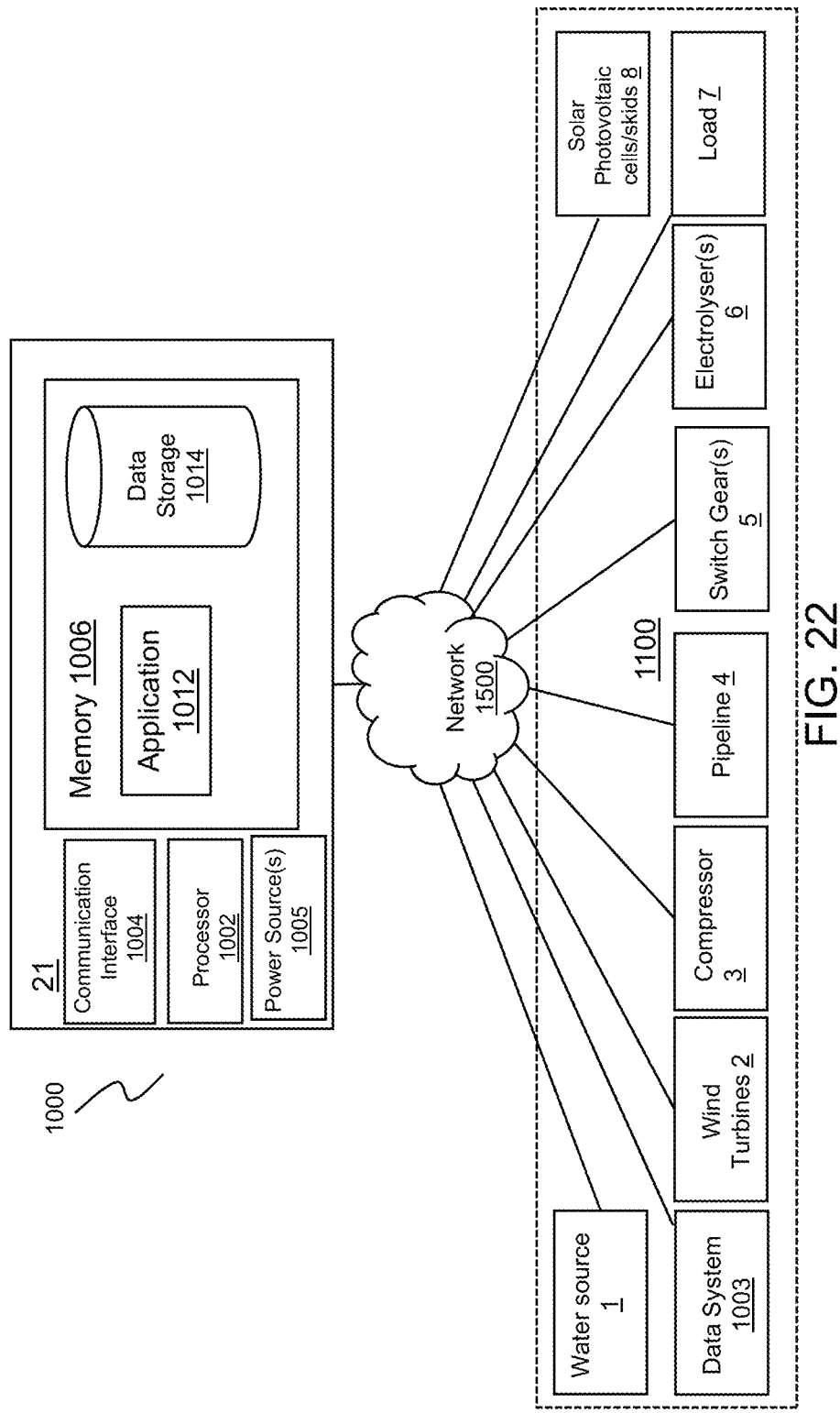
FIG. 22 illustrates a simplified schematic view of example system of FIG. 21.

FIG. 22 shows a generalized schematic view of example system 1000 for controlling a system for collecting, generating, and transmitting Gigawatt scale energy from a plurality of distributed sources dispersed over an area. System 1000 may comprise controller 21, described herein. Controller 21 includes a processor 1002 configured to implement processor readable instructions that, when executed, configure the processor 1002 to conduct operations described herein. The processor 1002 may be a microprocessor or microcontroller, a digital signal processing (DSP) processor, an integrated circuit, a field programmable gate array (FPGA), a reconfigurable processor, a programmable read-only memory (PROM), or combinations thereof. Controller 21 may include a communication interface 1004 to communicate with other computing or sensor devices, to access or connect to network resources, or to perform other computing applications by connecting to a network (or multiple networks) capable of carrying data. In some examples, the communication interface 1004 may include one or more busses, interconnects, wires, circuits, and/or any other connection and/or control circuit, or combination thereof. The communication interface 1004 may provide an interface for communicating data between the system 1000 and a display 1015 or an alarm 1016.

Controller 21 may also comprise connections for communicating with any pump coupled to the water source 1 according to this disclosure to transmit setpoint(s) or receive data regarding flow, valve position, and pressure data/values.

Controller 21 may comprise a sensor connection(s) for energy produced by wind turbine(s) 2 and solar photovoltaic cells/skids 8.

Controller 21 may comprise a connection(s) to a pressure sensor, e.g. pressure sensors on compressor 3 and/or pipelines 4. Controller may also communicate with compressor 3 and/or pipelines 4 to transmit setpoint(s) or receive data regarding flow, valve position, turbine speed, and pressure data/values.

Controller 21 may be coupled to a data system 1003 for storing system data and/or may be configured to communicate with cloud services such as iCloud, Dropbox, Google clouds, or any other digital data servers). Data system 1003 may also comprises a universal asynchronous receiver-transmitter (UART) to allow communication with other devices, e.g. a smartphone or a computer, for transmitting data for analysis and/or storage. UART may include or be coupled to a wireless transceiver for wireless communication with such other devices, e.g., by way of infra-red, Bluetooth, Wi-Fi, or the like. Controller 21 may also be coupled to water sources, data system 1003, wind turbines 2, compressor 3, pipeline 4, switch gear(s) 5, electrolyser 6, load 7, and/or solar photovoltaic cells/skids 8 via a network 1500. Network 1500 may include any wired or wireless communication path, such as an electrical circuit. In some embodiments, the network 1500 may include one or more busses, interconnects, wires, circuits, and/or any other connection and/or control circuit, or a combination thereof. In some embodiments, the network 1500 may include a wired or a wireless wide area network (WAN), local area network (LAN), a combination thereof, or the like. In some embodiments, the network 1500 may include a Bluetooth® network, a Bluetooth® low energy network, a short-range communication network, or the like.

Controller 21 may include memory 1006. The memory 1006 may include one or a combination of computer memory, such as static random-access memory (SRAM), random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like.

The memory 1006 may store an application 1012 including processor readable instructions for conducting operations described herein. In some examples, the application 1012 may include operations for controlling a system for collecting, generating, and transmitting Gigawatt scale energy from a plurality of distributed sources dispersed over an area.

In an embodiment, application 1012 may include operations for selectively electrically communicating each electrolyser(s) 6 with a first plurality of renewable energy sources, such as turbines 2 and/or solar photovoltaic cells/skids 8, within a current carry capacity threshold of a switch gear 5 at medium or high voltage. In another embodiment, application 1012 may include operations for communicating each electrolyser(s) 6 with a second plurality of renewable energy sources when the current carry capacity threshold decrease below a desired threshold of each electrolyser 6 for optimizing electrolyser efficiency.

In an embodiment, electrolyser(s) 6 comprise a first electrolyser and a second electrolyser coupled together at a switchgear having threshold value of for example about 3,150 A representing a maximum rating of the switchgear or components thereof such as busbars respective Bus-Coupler or Bus-Section circuit breakers. Application 1012 may include operations for automatically opening the switchgear to disconnect the first electrolyser from the second electrolyser.

In an embodiment, application 1012 may include operations for increasing pressure in pipeline 4 when energy generated by the renewable energy sources, e.g., wind turbines 2 and/or solar photovoltaic cells/skids 8, is greater than energy consumed by the load 7. The renewable energy sources may comprise concentrated solar power plant (CSP) string(s) including a plurality of concentrated solar power plant generators; a wave and/or tidal power generator string including a plurality of wave and/or tidal power generators; and a geothermal power string including a plurality of geothermal power generators.

In an embodiment, application 1012 may include operations for reducing Hydrogen ($H_2$), or hydrogen compound, demand by load 7 when pressure in pipeline 4 reaches a minimum threshold. In an example, the minimum threshold is about less than 50 bar.

In an embodiment, application 1012 may include operations for causing compressor 3 to compress $H_2$, or hydrogen compound, into pipeline 4 at a rate lower than a rate of $H_2$, or hydrogen compound, consumed by load 7.

In an embodiment, application 1012 may include operations for converting greater than 50% of the energy generated by the renewable energy sources, e.g. wind turbines 2 and electrolyser(s) 6 into $H_2$, or hydrogen compound, by the at least one electrolyzer for transmission to the load.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A system for collecting, generating, and transmitting Gigawatt scale energy from a plurality of distributed sources dispersed over an area, the system comprising:
   a load; and
   a geographically dispersed network comprising a plurality of nodes dispersed over the area, each node comprising:
      a water source;
      renewable energy sources comprising:
         a wind turbine string of a plurality of wind turbines; and
         a solar photovoltaic string of a plurality of solar photovoltaic skids; and
      a nodal substation in electrical communication with the renewable energy sources, the nodal substation comprising:
         at least one electrolyser in electrical communication with the renewable energy sources, the at least one electrolyser configured to convert water from the water source into hydrogen ($H_2$), or a hydrogen compound, with electricity from the renewable energy sources; and
         a compressor to compress $H_2$, or a hydrogen compound, from the at least one electrolyser into a pipeline fluidly connecting each of the nodes to the load;
      wherein the nodal substation is positioned a distance from the renewable energy sources, the distance selected such that:
         Energy Efficiency$_{H2\ transmission}$>Energy Efficiency$_{High\ voltage\ power\ transmission}$,
         where Energy Efficiency$_{H2\ transmission}$ is the energy efficiency of transmitting energy from the renewable energy sources to the load via the nodal substation as $H_2$ or a hydrogen compound, and
         where Energy Efficiency$_{High\ voltage\ power\ transmission}$ is the energy efficiency of transmitting energy from the renewable energy sources to the load via high voltage power transmission; and
      wherein the renewable energy sources define a perimeter, and the nodal substation is defined with the perimeter;
   wherein each of the plurality of nodes are positioned at different locations along the pipeline in fluid communication with the load; and wherein the perimeters defined by the renewable energy sources of the nodes are dispersed over the area.

2. The system of claim 1, wherein the renewable energy sources of each node comprise a plurality of wind turbine strings and a plurality of photovoltaic strings in electrical communication.

3. The system of claim 1, wherein the area is at least 500 $km^2$.

4. The system of claim 1, wherein each node collects energy from the renewable sources at a distributed voltage level from the wind turbine and photovoltaic strings, the node positioned within 50 km of the wind turbine and photovoltaic strings.

5. The system of claim 1, wherein the renewable energy sources are in electrical communication with the load, and wherein the node comprises at least one step-up power transformer in electrical communication with the renewable energy sources and the load, the at least one transformer configured to increase the voltage of electricity transmitted to the load from the renewable energy sources.

6. The system of claim 5, wherein:
the at least one step up transformer is configured to transmit about 1-10% of the energy generated by the renewable energy sources to the load;
the at least one electrolyser is configured to receive at least 90% of the energy generated by the renewable energy sources; and
the system is islanded.

7. The system of claim 1, wherein a ratio of each renewable energy source is configured to provide a lowest levelized cost of energy (LCOE), wherein the LCOE is:

{(overnight capital cost*capital recovery factor+fixed O&M cost)/(8760*capacity factor)}+(fuel cost*heat rate)+variable O&M cost.

8. The system of claim 1, wherein each node is configured to generate maximum energy based on a current carrying capacity limit of a switchgear and transformer of each node, wherein the generated energy can be collected at medium voltage and/or high voltage.

9. The system of claim 1, wherein the solar photovoltaic string is a solar farm comprising a maximum number of solar photovoltaic skids limited by a current carrying capacity of a switchgear of the solar photovoltaic string at medium voltage and/or high voltage.

10. The system of claim 1, wherein each solar photovoltaic string is defined within a perimeter of the wind turbine strings.

11. The system of claim 1, wherein the wind turbine string comprises a maximum number of wind turbines limited by a current carrying capacity of a switchgear of the wind turbine string at medium voltage and/or high voltage.

12. The system of claim 1, wherein the load is configured to use the hydrogen, and the load is at least one of an ammonia, methanol, or methane processing plant.

13. The system of claim 1, comprising a controller configured to selectively electrically communicate each electrolyser with the renewable energy sources within a current carrying capacity threshold of a switch gear at medium or high voltage.

14. The system of claim 13, wherein the at least one electrolyser comprises a first electrolyser and a second electrolyser electrically coupled together at the switchgear having a threshold value representing a rating of the switchgear, and wherein the controller is configured to electrically disconnect the first electrolyser from the second electrolyser when the threshold value is exceeded.

15. The system of claim 13, wherein the controller is configured to cause the compressor to compress $H_2$, or hydrogen compound, into the pipeline at a rate lower than a rate of $H_2$, or hydrogen compound, consumed by the load.

16. The system of claim 1, comprising a controller configured to increase pressure in the pipeline when energy generated by the renewable energy sources is greater than energy consumed by the load.

17. The system of claim 16, wherein the controller is configured to reduce $H_2$, or hydrogen compound, demand by the load when pressure in the pipeline reaches a minimum threshold, optionally the minimum threshold is about less than 50 bar.

18. The system of claim 1, wherein each node is in electrical communication with Extremely High Voltage (EHV) or High Voltage transmission lines, power cables, power transformers and switchgear rated to their maximum current carrying capacity to transmit electricity to the load.

19. The system of claim 1, where the gigawatt scale energy is at least 6 GW.

20. The system of claim 1, wherein each of the plurality of nodes are positioned adjacent to at least one of the other plurality of nodes.

* * * * *